United States Patent
Dutta et al.

(10) Patent No.: US 8,914,269 B2
(45) Date of Patent: Dec. 16, 2014

(54) METHODS AND DEVICES FOR TRANSFORMATION OF COLLECTED DATA FOR IMPROVED VISUALIZATION CAPABILITY

(75) Inventors: Nader Dutta, Houston, TX (US); Jianchun Dai, Houston, TX (US); Sherman Yang, Houston, TX (US); Ling Duan, Katy, TX (US); Arturo Ramirez, Sugarland, TX (US); Ran Bachrach, Houston, TX (US); Anubrati Mukherjee, West Bengal (IN)

(73) Assignee: WesternGeco L.L.C., Houston, TX (US)

( * ) Notice: Subject to any disclaimer, the term of this patent is extended or adjusted under 35 U.S.C. 154(b) by 526 days.

(21) Appl. No.: 13/179,461

(22) Filed: Jul. 8, 2011

(65) Prior Publication Data

US 2012/0059633 A1 Mar. 8, 2012

Related U.S. Application Data

(60) Provisional application No. 61/362,361, filed on Jul. 8, 2010.

(51) Int. Cl.
*G06F 7/60* (2006.01)
*G06G 7/48* (2006.01)
*G01V 1/30* (2006.01)

(52) U.S. Cl.
CPC ............ *G01V 1/303* (2013.01); *G01V 2210/51* (2013.01)
USPC ...................................... 703/10; 703/2; 703/6

(58) Field of Classification Search
None
See application file for complete search history.

(56) References Cited

U.S. PATENT DOCUMENTS

| 6,968,274 | B2 | 11/2005 | Tutuncu et al. | |
|---|---|---|---|---|
| 7,177,764 | B2 | 2/2007 | Stone | |
| 7,363,161 | B2 | 4/2008 | Georgi et al. | |
| 7,424,367 | B2 | 9/2008 | Saltzer et al. | |
| 8,117,014 | B2* | 2/2012 | Prioul et al. | 703/2 |
| 2004/0236513 | A1* | 11/2004 | Tutuncu et al. | 702/11 |
| 2006/0273788 | A1* | 12/2006 | Georgi et al. | 324/303 |
| 2010/0135115 | A1* | 6/2010 | Sun et al. | 367/75 |
| 2011/0046934 | A1* | 2/2011 | Hatchell et al. | 703/10 |
| 2011/0108283 | A1* | 5/2011 | Srnka et al. | 166/369 |

OTHER PUBLICATIONS

Bowers, G. L., "Pore Pressure Estimation From Velocity Data: Accounting for Overpressure Mechanisms Besides Undercompaction", SPE Drilling & Completion, vol. 10(2), 1995, pp. 89-95.
Dutta, N.C., "Fluid Flow in Low Permeable Media", Migration of Hydrocarbons in Sedimentary Basins; Brigitte Doligez, Ed., Editions Technip, Paris, 1987, pp. 567-595.

(Continued)

*Primary Examiner* — Omar Fernandez Rivas
*Assistant Examiner* — Nithya J Moll
(74) *Attorney, Agent, or Firm* — Gary Gex

(57) ABSTRACT

Rock physics guided migration is disclosed to enhance subsurface three-dimensional geologic formation evaluation. In one embodiment, a geologic interpretation is generated based on a seismic data volume. Sets of compaction and acoustic formation factor curves are generated, and these are combined into a set of velocity-relationship curves. A pore pressure is derived and used to establish a pore pressure state. A rock physics template is then generated utilizing the derived information. This rock physics template can be used to refine geologic formation evaluation with any suitable form of migration technique.

26 Claims, 22 Drawing Sheets

(56) References Cited

OTHER PUBLICATIONS

Dutta, N.C., "Shale Compaction, Burial Diagenesis and Geopressure: A Dynamic Model, Solution and Some Results", Thermal Modeling in Sedimentary Basins, J. Burrus, Ed., Editions Technip, Paris, 1986, pp. 149-172.

Eaton, Ben A., "How to Use Drilling Petrophysical Data in Prospect Evaluation, Part 1", World Oil, 1995, pp. 69-72.

Eberhart-Phillips, et al., "Crustal strain near the Big Bend of the San Andreas Fault: Analysis of the Los Padres-Tehachapi Trilateration Networks, California", Journal of Geophysical Research, vol. 95(B2), 1990, pp. 1139-1153.

Pennebaker, E. S., "Seismic Data Indicate Depth, Magnitude of Abnormal Pressures", World Oil, vol. 166(7), 1968, pp. 73-78.

Raiga-Clemenceau, et al., "The Concept of Acoustic Formation Factor for More Accurate Porosity Determination from Sonic Transit Time Data", Society of Petrophysicists & Well Log Analysts, vol. 29(1), 1988, pp. 54-60.

International Search Report and Written Opinion of PCT Application No. PCT/US2011/043473 dated Mar. 2, 2012: pp. 1-9.

\* cited by examiner

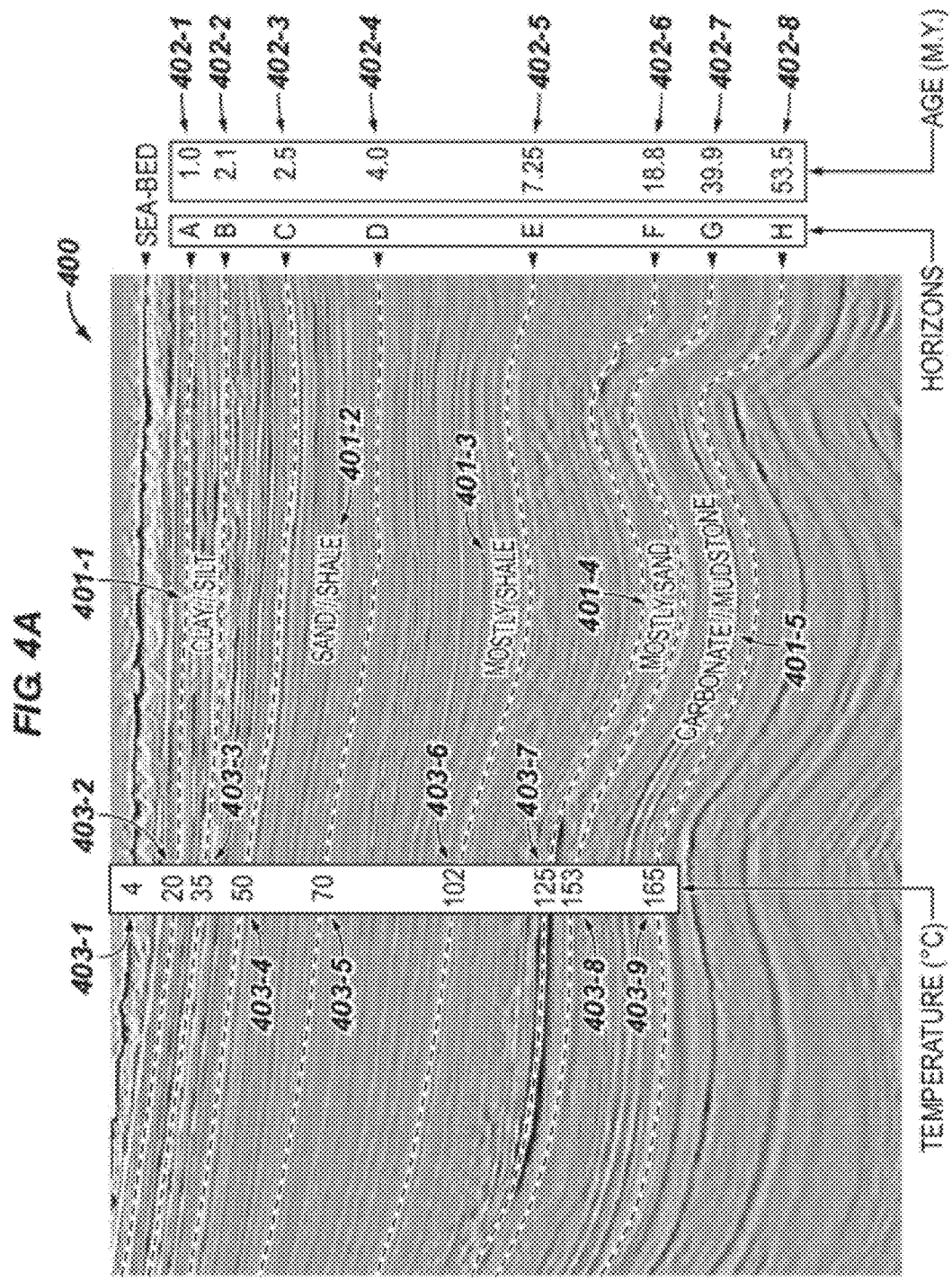

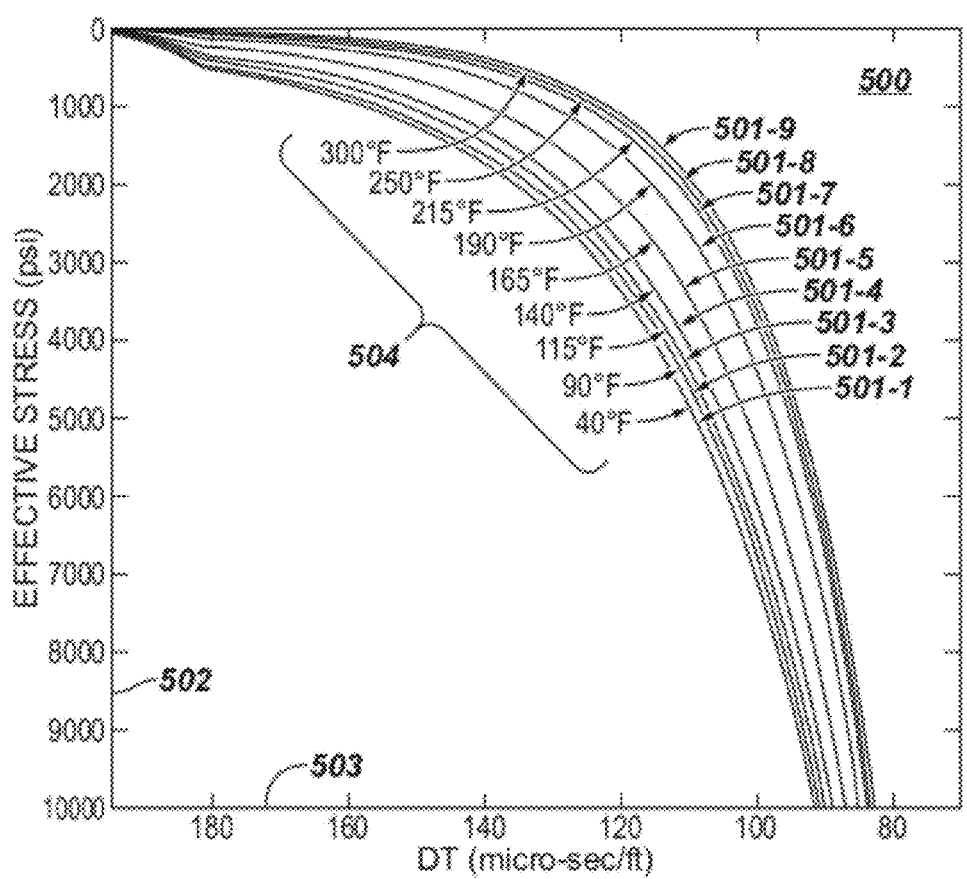

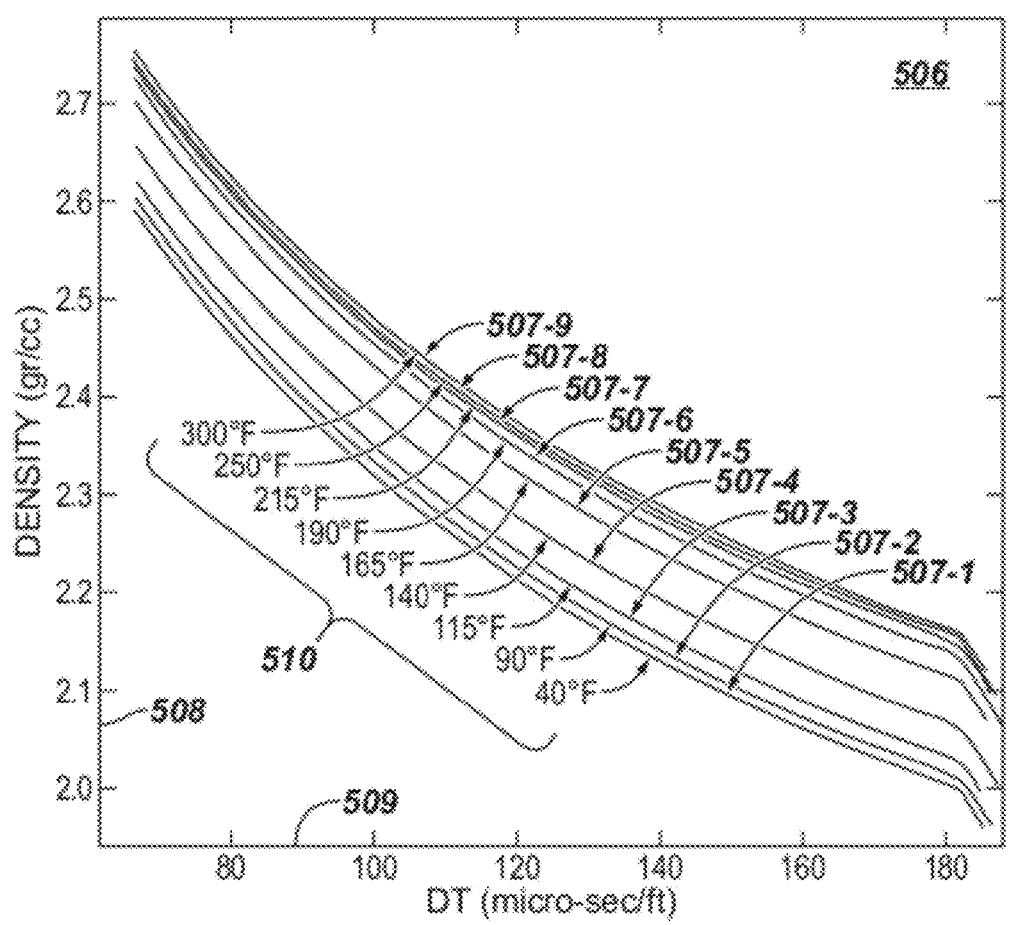

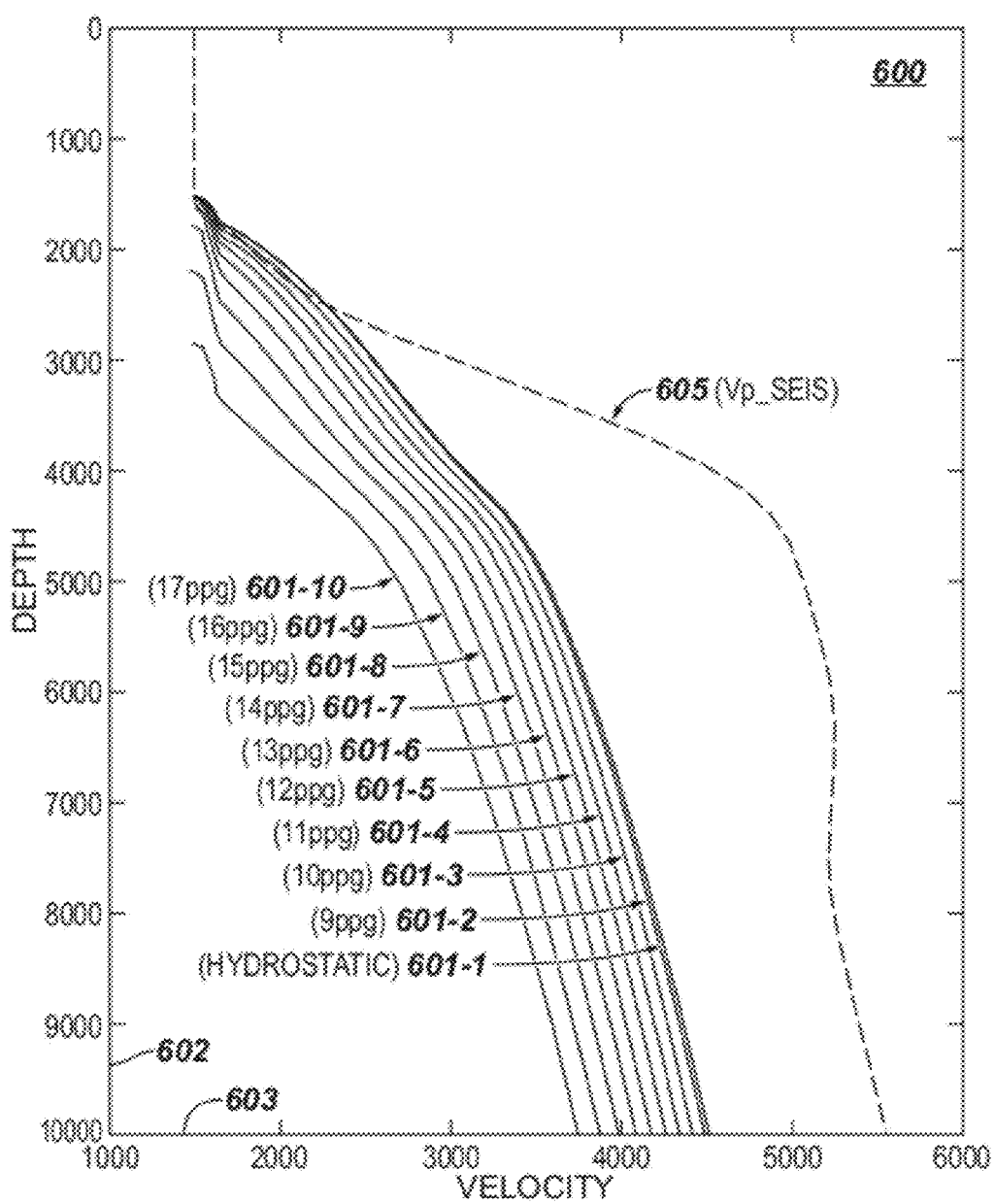

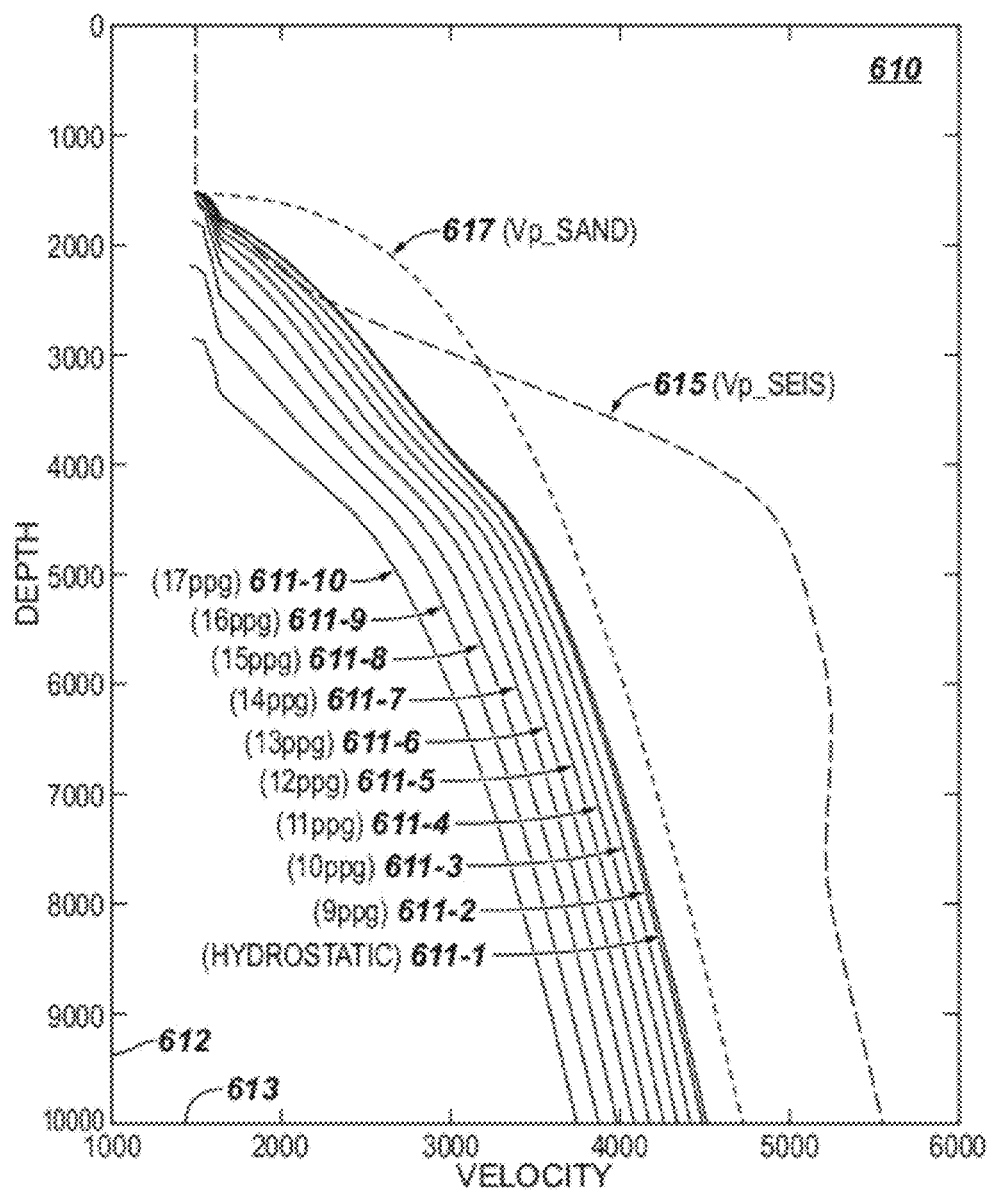

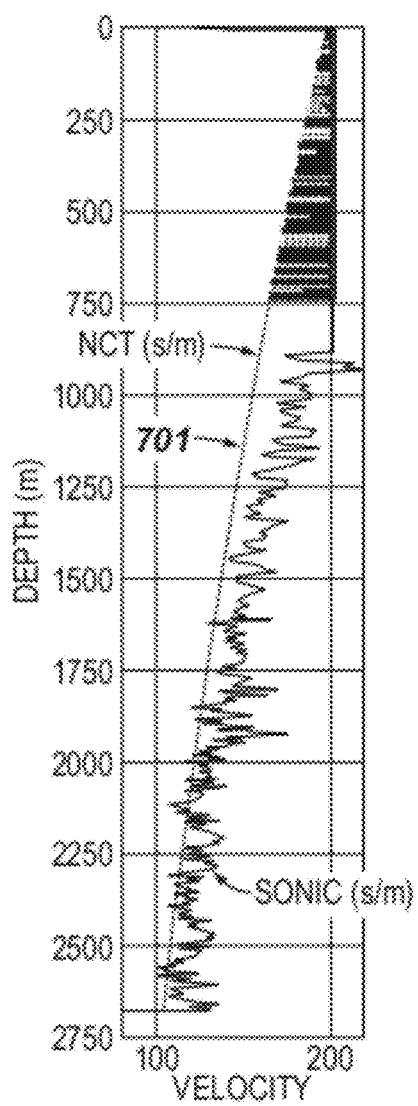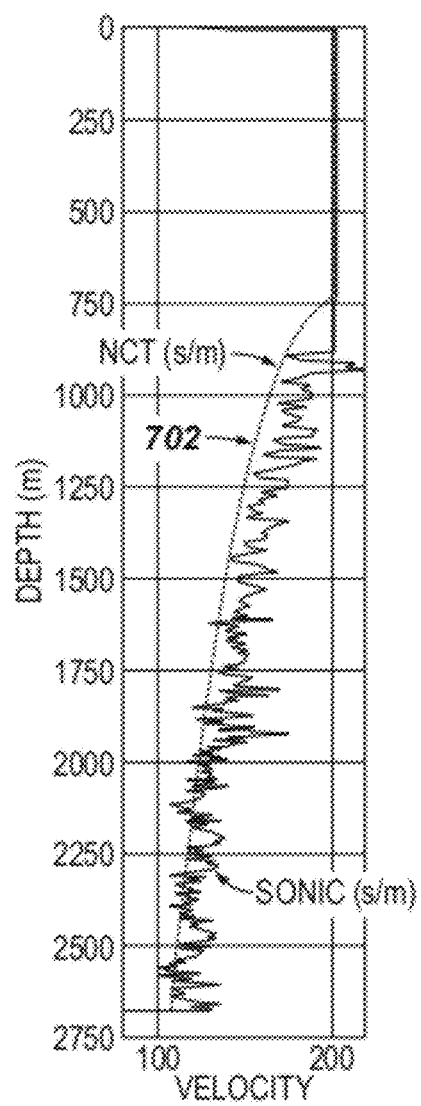

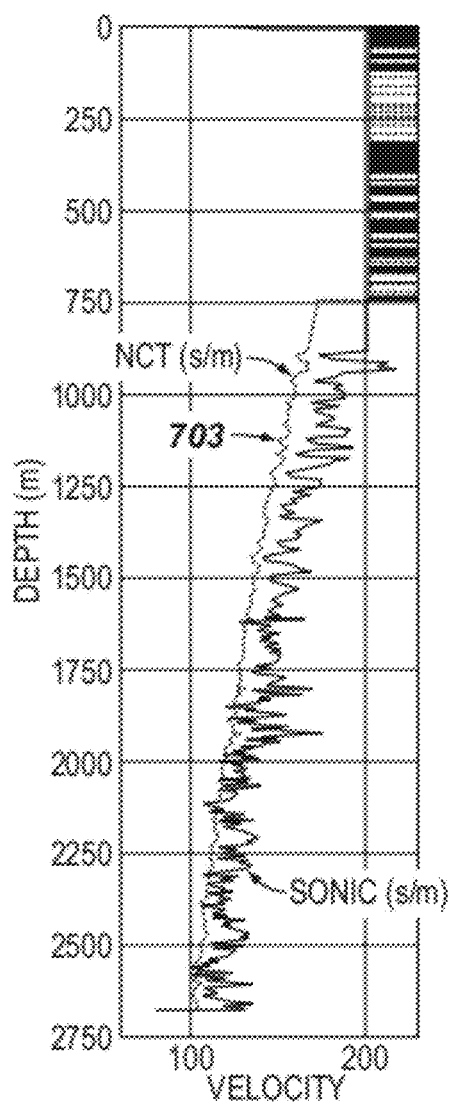

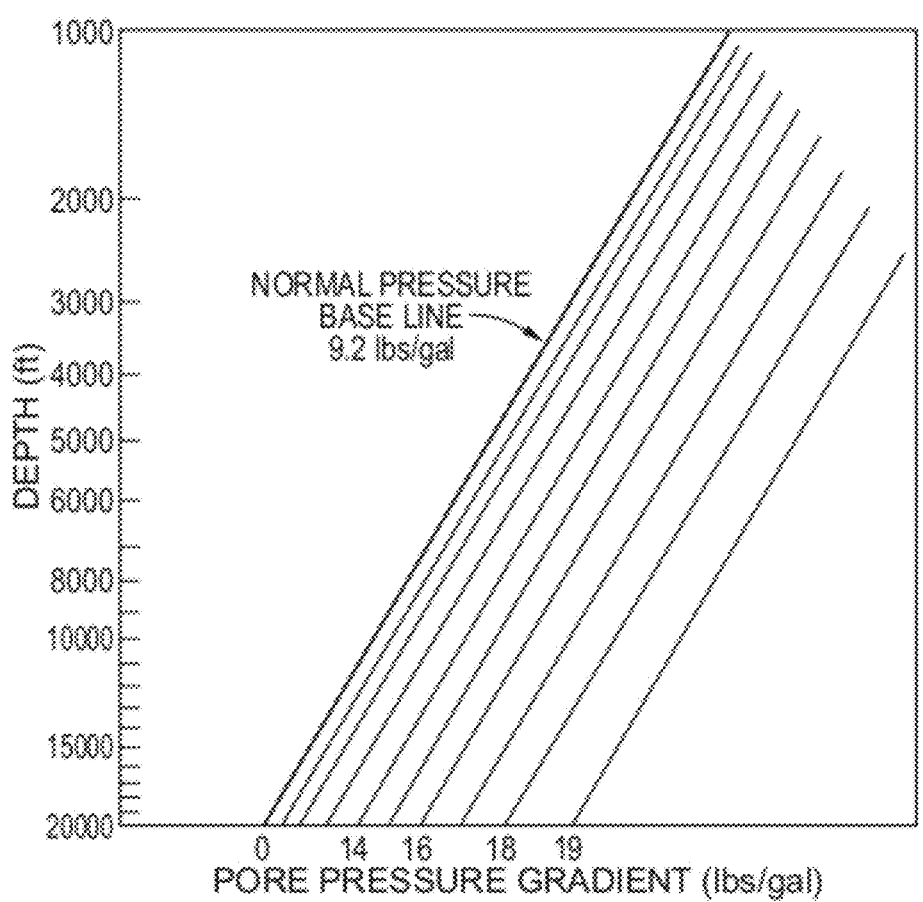

1200

1202 For at least one rock type disposed in a subsurface three-dimensional geologic formation, generate an initial velocity model based on a first seismic data volume that corresponds to the subsurface three-dimensional geologic formation.

1204 The first seismic data volume contains one or more seismic gathers.

1206 Generate a rock physics template having at least a set of one or more depth dependent velocity curves.

1208 The rock physics template is based at least in part on a geologic interpretation.

1210 Generate a revised velocity model by revising the initial velocity model based at least in part on the rock physics template.

1212 Performing one or more iterations of tomography to increase relative flatness of at least one of the one or more seismic gathers.

1214 Determine whether at least one of the one or more seismic gathers is flatter than a predetermined flatness threshold.

1216 Update the rock physics template when the determination of whether at least one of the one or more seismic gathers met the predetermined flatness threshold is negative.

1218 Perform one or more iterations of migration on at least one of the one or more seismic gathers.

1220 The migration is isotropic migration.

1222 The migration is anisotropic migration.

1224 Performing one or more post-stack enhancements to the first seismic data volume when the determination of whether at least one of the one or more seismic gathers met the predetermined flatness threshold is positive.

METHODS AND DEVICES FOR TRANSFORMATION OF COLLECTED DATA FOR IMPROVED VISUALIZATION CAPABILITY

RELATED APPLICATIONS

This application claims priority to U.S. Provisional Patent App. No. 61/362,361 "Stress Compensated Seismic Velocity Estimation," filed on Jul. 8, 2010. The content of this provisional patent application is incorporated by reference herein in its entirety.

TECHNICAL FIELD

The disclosed embodiments relate generally to data analysis, and more particularly, to computing devices and methods for building velocity models prior to migration of collected data.

BACKGROUND

Migration is a tool used in seismic processing to create an accurate image of the subsurface. In migration, geophysical events, such as changes in energy, are geometrically re-located in space and/or time to the location that the event occurred in the subsurface, rather than the location that it was recorded at the surface. Thus, migration involves repositioning of return signals to show an event (layer boundary or other structure) where it is being hit by the seismic wave, rather than where it is received and recorded. Consequently, various forms of migration are standard in data processing techniques for all geophysical methods (seismic, ground penetrating radar and electromagnetic sounding, for example).

Unfortunately, the computational migration needed for large datasets acquired today is extremely demanding on modern computers, and the process is very time consuming. This is because the reliability of the migrated image and the properties of the earth model that it samples either directly or indirectly are acutely dependent on the nature of the velocity field. As a result, the process of velocity model building can be repetitive.

Further, conventional approaches to build velocity models prior to migration can be less than desirable in several ways: 1) the velocity field often bears little or no semblance to true earth velocity (this is especially problematic before drilling a well); 2) even with data gained from an actually drilled well, it can be difficult to build a three-dimensional velocity model because the velocity function from the well typically samples the velocity field only in one dimension (vertical); and 3) these velocity fields are not made to reflect the actual geology of the area in question. As a result, the image produced after migration (migrated image) often depicts subsurface features at the wrong depths, and/or the subsurface structures are not clear.

Moreover, the final velocity fields cannot be used for deriving true earth properties such as pore pressure without further conditioning of the velocity that has just gone through an elaborate and expensive process of migration. These limitations are particularly acute for subsurface imaging in complex geologic areas such as highly faulted areas, and areas with salt and basalt where there is a lack of signal and coherent events.

The process of building a rock physics guided velocity model that is consistent with local geology will yield a migrated image that will not only put the reflectors of seismic image at correct depths—even in complex geologic areas as enumerated above—but also will yield velocities that can be directly used to derive subsurface properties such as pore pressure, fracture pressure, and lithostatic or overburden pressure.

Further, sub-salt body velocity analysis can be difficult due to lack of signal and coherent events. As a result, sub-salt velocity modeling often fails to accurately account for two important effects: temperature effects and geologic time on rock physics models that can relate effective stress to velocity and the increased heat flow through salt that alters the sediment properties adjacent to salt bodies. Moreover, these difficulties related to velocity analysis for sub-salt bodies generally occur in analysis related to large-scale "hard" or "fast" geobodies, including velocity analysis for sub-basalt and sub-carbonate regions in large areal extensions and/or significant vertical depths. Rock physics models can be used to compensate for these issues by providing a template that relates porosity and effective stress to geologic time and temperature for a given lithology.

The processing and application of seismic data, and particularly to estimation of seismic velocities, that uses rock physics as a guide to build velocity models can be used to improve any technique for migration of seismic data. For seismic velocities at any depth, velocity conditioning is achieved by creating one or more rock physics based templates of expected rock velocities versus depth for a given rock type (or a mixture of various rock types) based on basic principles of rock physics and geology. These templates are then used to build appropriate one- or multi-dimensional velocity models. When these conditioned (or constrained) velocities are used as a guide function to build a final velocity model, for example, using tomographic velocity inversion and input to a chosen migration algorithm, a superior migrated image can be generated. Note that this improved migrated image not only improves the depth expression or estimation of imaged subsurface features, but furthermore, a velocity field is created that can be directly used in earth property estimation to estimate metrics such as pore pressure, fracture pressure, overburden pressure, rock and fluid types, porosity, density and other attributes as a function of either depth or two-way travel time, i.e., the round-trip travel time for a seismic signal to travel from the a source to a reflection point and back to a receiver.

This procedure is very flexible and can be used in any migration procedure, including, but not limited to, the following exemplary migration techniques: Prestack Time Migration (PSTM), Kirchhoff Prestack Depth migration (KPSDM), Prestack Depth migration (PSDM), Reverse Time Migration (RTM), Gaussian Packet Beam Migration (GPM), Wave-equation migration (WEM), and Full Wave Inversion (FWI).

Accordingly, there is a need for methods and systems that can employ faster, more efficient, and more accurate methods for building velocity models prior to migration, such as developing seismic interpretations using rock physics guided migration. Such methods and systems may complement or replace conventional methods and systems for building velocity models prior to migration.

SUMMARY

The above deficiencies and other problems associated with building velocity models prior to migration are reduced or eliminated by the disclosed methods and devices.

In accordance with some embodiments, a method is performed, where for one or more rock types disposed in a subsurface three-dimensional geologic formation, the method includes: generating a geologic interpretation based on a first seismic data volume that corresponds to the subsurface three-dimensional geologic formation; generating a set of one or more compaction curves; and generating a set of one or more acoustic formation factor curves for at least one of the one or more rock types. Then for one or more of the one or more rock types, the method includes: combining the set of one or more compaction curves with the set of one or more acoustic formation factor curves to form a first set of velocity-relationship curves that relate rock velocity with at least one criteria selected from the group consisting of effective stress and temperature; deriving a first overburden pressure; deriving a first pore pressure state using the first overburden pressure and the first set of velocity-relationship curves; and generating a first rock physics template having at least a set of one or more depth dependent velocity curves and one or more bulk density curves.

In accordance with some embodiments, a computing system is provided that includes at least one processor, at least one memory, and one or more programs stored in the at least one memory, wherein the one or more programs are configured to be executed by the one or more processors, the one or more programs including instructions for performing the following steps: for one or more rock types disposed in a subsurface three-dimensional geologic formation, generating a geologic interpretation based on a first seismic data volume that corresponds to the subsurface three-dimensional geologic formation; generating a set of one or more compaction curves; and generating a set of one or more acoustic formation factor curves for at least one of the one or more rock types; then for one or more of the one or more rock types, combining the set of one or more compaction curves with the set of one or more acoustic formation factor curves to form a first set of velocity-relationship curves that relate rock velocity with at least one criteria selected from the group consisting of effective stress and temperature; deriving a first overburden pressure; deriving a first pore pressure state using the first overburden pressure and the first set of velocity-relationship curves; and generating a first rock physics template having at least a set of one or more depth dependent velocity curves and one or more bulk density curves.

In accordance with some embodiments, a computer readable storage medium having a set of one or more programs including instructions that when executed by a computing system cause the computing system to: for one or more rock types disposed in a subsurface three-dimensional geologic formation, generate a geologic interpretation based on a first seismic data volume that corresponds to the subsurface three-dimensional geologic formation; generate a set of one or more compaction curves; generate a set of one or more acoustic formation factor curves for at least one of the one or more rock types; for one or more of the one or more rock types: combine the set of one or more compaction curves with the set of one or more acoustic formation factor curves to form a first set of velocity-relationship curves that relate rock velocity with at least one criteria selected from the group consisting of effective stress and temperature; derive a first overburden pressure; derive a first pore pressure state using the first overburden pressure and the first set of velocity-relationship curves; and generate a first rock physics template having at least a set of one or more depth dependent velocity curves and one or more bulk density curves In accordance with some embodiments, a system includes at least one processor, at least one memory, and one or more programs stored in the at least one memory; and means for generating a geologic interpretation based on a first seismic data volume that corresponds to the subsurface three-dimensional geologic formation; means for generating a set of one or more compaction curves; means for generating a set of one or more acoustic formation factor curves for at least one of the one or more rock types; furthermore, for one or more of the one or more rock types, means for combining the set of one or more compaction curves with the set of one or more acoustic formation factor curves to form a first set of velocity-relationship curves that relate rock velocity with at least one criteria selected from the group consisting of effective stress and temperature; means for deriving a first overburden pressure; means for deriving a first pore pressure state using the first overburden pressure and the first set of velocity-relationship curves; and means for generating a first rock physics template having at least a set of one or more depth dependent velocity curves and one or more bulk density curves.

In accordance with some embodiments, an information processing apparatus for use in a computing system includes means for generating a geologic interpretation based on a first seismic data volume that corresponds to the subsurface three-dimensional geologic formation; means for generating a set of one or more compaction curves; means for generating a set of one or more acoustic formation factor curves for at least one of the one or more rock types; furthermore, for one or more of the one or more rock types, means for combining the set of one or more compaction curves with the set of one or more acoustic formation factor curves to form a first set of velocity-relationship curves that relate rock velocity with at least one criteria selected from the group consisting of effective stress and temperature; means for deriving a first overburden pressure; means for deriving a first pore pressure state using the first overburden pressure and the first set of velocity-relationship curves; and means for generating a first rock physics template having at least a set of one or more depth dependent velocity curves and one or more bulk density curves.

In accordance with some embodiments, a method is performed, where for one or more physical bodies disposed in a subsurface three-dimensional formation, the method includes: generating a subsurface interpretation based on a first collected data volume that corresponds to the subsurface three-dimensional formation; generating a set of one or more compaction curves; generating a set of one or more acoustic formation factor curves for at least one of the one or more physical body types; and for one or more of the one or more physical body types: combining the set of one or more compaction curves with the set of one or more acoustic formation factor curves to form a first set of velocity-relationship curves that relate physical body velocity with at least one criteria selected from the group consisting of effective stress and temperature; deriving a first overburden pressure; deriving a first pressure state using the first overburden pressure and the first set of velocity-relationship curves, wherein the first pressure state corresponds to an intrabody pressure within the physical body type being analyzed; and generating a first physical bodies physics template having at least a set of one or more depth dependent velocity curves and one or more bulk density curves.

In accordance with some embodiments, a computing system is provided that includes at least one processor, at least one memory, and one or more programs stored in the at least one memory, wherein the one or more programs are configured to be executed by the one or more processors, the one or more programs including instructions for performing the following steps: generating a subsurface interpretation based on a first collected data volume that corresponds to the subsurface three-dimensional formation; generating a set of one or more compaction curves; generating a set of one or more acoustic formation factor curves for at least one of the one or more physical body types; and for one or more of the one or more physical body types: combining the set of one or more compaction curves with the set of one or more acoustic formation factor curves to form a first set of velocity-relationship curves that relate physical body velocity with at least one criteria selected from the group consisting of effective stress and temperature; deriving a first overburden pressure; deriving a first pressure state using the first overburden pressure and the first set of velocity-relationship curves, wherein the first pressure state corresponds to an intrabody pressure within the physical body type being analyzed; and generating a first physical bodies physics template having at least a set of one or more depth dependent velocity curves and one or more bulk density curves.

In accordance with some embodiments, a computer readable storage medium having a set of one or more programs including instructions that when executed by a computing system cause the computing system to: generate a subsurface interpretation based on a first collected data volume that corresponds to the subsurface three-dimensional formation; generate a set of one or more compaction curves; generate a set of one or more acoustic formation factor curves for at least one of the one or more physical body types; and for one or more of the one or more physical body types: combine the set of one or more compaction curves with the set of one or more acoustic formation factor curves to form a first set of velocity-relationship curves that relate physical body velocity with at least one criteria selected from the group consisting of effective stress and temperature; derive a first overburden pressure; derive a first pressure state using the first overburden pressure and the first set of velocity-relationship curves, wherein the first pressure state corresponds to an intrabody pressure within the physical body type being analyzed; and generate a first physical bodies physics template having at least a set of one or more depth dependent velocity curves and one or more bulk density curves.

In accordance with some embodiments, a system includes at least one processor, at least one memory, and one or more programs stored in the at least one memory; and means for generating a subsurface interpretation based on a first collected data volume that corresponds to the subsurface three-dimensional formation; means for generating a set of one or more compaction curves; means for generating a set of one or more acoustic formation factor curves for at least one of the one or more physical body types; and for one or more of the one or more physical body types: means for combining the set of one or more compaction curves with the set of one or more acoustic formation factor curves to form a first set of velocity-relationship curves that relate physical body velocity with at least one criteria selected from the group consisting of effective stress and temperature; means for deriving a first overburden pressure; means for deriving a first pressure state using the first overburden pressure and the first set of velocity-relationship curves, wherein the first pressure state corresponds to an intrabody pressure within the physical body type being analyzed; and means for generating a first physical bodies physics template having at least a set of one or more depth dependent velocity curves and one or more bulk density curves.

In accordance with some embodiments, an information processing apparatus for use in a computing system includes means for generating a subsurface interpretation based on a first collected data volume that corresponds to the subsurface three-dimensional formation; means for generating a set of one or more compaction curves; means for generating a set of one or more acoustic formation factor curves for at least one of the one or more physical body types; and for one or more of the one or more physical body types: means for combining the set of one or more compaction curves with the set of one or more acoustic formation factor curves to form a first set of velocity-relationship curves that relate physical body velocity with at least one criteria selected from the group consisting of effective stress and temperature; means for deriving a first overburden pressure; means for deriving a first pressure state using the first overburden pressure and the first set of velocity-relationship curves, wherein the first pressure state corresponds to an intrabody pressure within the physical body type being analyzed; and means for generating a first physical bodies physics template having at least a set of one or more depth dependent velocity curves and one or more bulk density curves.

In accordance with some embodiments, a method is performed, where the method includes for at least one rock type disposed in a subsurface three-dimensional geologic formation: generating an initial velocity model based on a first seismic data volume that corresponds to the subsurface three-dimensional geologic formation; generating a rock physics template having at least a set of one or more depth dependent velocity curves; and generating a revised velocity model by revising the initial velocity model based at least in part on the rock physics template.

In accordance with some embodiments, a computing system is provided that includes at least one processor, at least one memory, and one or more programs stored in the at least one memory, wherein the one or more programs are configured to be executed by the one or more processors, the one or more programs including instructions for performing the following steps: for at least one rock type disposed in a subsurface three-dimensional geologic formation: generating an initial velocity model based on a first seismic data volume that corresponds to the subsurface three-dimensional geologic formation; generating a rock physics template having at least a set of one or more depth dependent velocity curves; and generating a revised velocity model by revising the initial velocity model based at least in part on the rock physics template.

In accordance with some embodiments, a computer readable storage medium having a set of one or more programs including instructions that when executed by a computing system cause the computing system to: generate an initial velocity model based on a first seismic data volume that corresponds to the subsurface three-dimensional geologic formation for at least one rock type disposed in a subsurface three-dimensional geologic formation; generate a rock physics template having at least a set of one or more depth dependent velocity curves; and generate a revised velocity model by revising the initial velocity model based at least in part on the rock physics template.

In accordance with some embodiments, a system includes at least one processor, at least one memory, and one or more programs stored in the at least one memory; and means for generating an initial velocity model based on a first seismic data volume that corresponds to the subsurface three-dimensional geologic formation for at least one rock type disposed in a subsurface three-dimensional geologic formation; means for generating a rock physics template having at least a set of one or more depth dependent velocity curves; and means for generating a revised velocity model by revising the initial velocity model based at least in part on the rock physics template.

In accordance with some embodiments, an information processing apparatus for use in a computing system includes means for generating an initial velocity model based on a first seismic data volume that corresponds to the subsurface three-dimensional geologic formation for at least one rock type disposed in a subsurface three-dimensional geologic formation; means for generating a rock physics template having at least a set of one or more depth dependent velocity curves; and means for generating a revised velocity model by revising the initial velocity model based at least in part on the rock physics template.

In accordance with some embodiments, a method is performed, where for at least one physical body type disposed in a subsurface three-dimensional formation, the method includes: generating an initial velocity model based on a first collected data volume that corresponds to the subsurface three-dimensional formation; generating a physical body physics template having at least a set of one or more depth dependent velocity curves; and generating a revised velocity model by revising the initial velocity model based at least in part on the physical body physics template.

In accordance with some embodiments, a computing system is provided that includes at least one processor, at least one memory, and one or more programs stored in the at least one memory, wherein the one or more programs are configured to be executed by the one or more processors, the one or more programs including instructions for performing the following steps: generating an initial velocity model based on a first collected data volume that corresponds to the subsurface three-dimensional formation; generating a physical body physics template having at least a set of one or more depth dependent velocity curves; and generating a revised velocity model by revising the initial velocity model based at least in part on the physical body physics template.

In accordance with some embodiments, a computer readable storage medium having a set of one or more programs including instructions that when executed by a computing system cause the computing system to: generate an initial velocity model based on a first collected data volume that corresponds to the subsurface three-dimensional formation; generate a physical body physics template having at least a set of one or more depth dependent velocity curves; and generate a revised velocity model by revising the initial velocity model based at least in part on the physical body physics template.

In accordance with some embodiments, a system includes at least one processor, at least one memory, and one or more programs stored in the at least one memory; and means for generating an initial velocity model based on a first collected data volume that corresponds to the subsurface three-dimensional formation; means for generating a physical body physics template having at least a set of one or more depth dependent velocity curves; and means for generating a revised velocity model by revising the initial velocity model based at least in part on the physical body physics template.

In accordance with some embodiments, an information processing apparatus for use in a computing system includes means for generating an initial velocity model based on a first collected data volume that corresponds to the subsurface three-dimensional formation; means for generating a physical body physics template having at least a set of one or more depth dependent velocity curves; and means for generating a revised velocity model by revising the initial velocity model based at least in part on the physical body physics template.

In accordance with some embodiments, a method is performed, where for a physical body disposed in a subsurface three-dimensional formation, the method includes: generating one or more velocity models by processing a set of modeling data that corresponds to the subsurface three-dimensional formation, wherein the one or more velocity models includes a first set of velocity values for a region that is substantially proximate to the physical body; generating one or more effective stress estimates for the region that is substantially proximate to the physical body; and predicting a second set of velocity values for the region that is substantially proximate to the physical body by extrapolating one or more revised velocities based at least in part on the one or more velocity models, the one or more effective stress estimates, and a rock physics template.

In accordance with some embodiments, a computing system is provided that includes at least one processor, at least one memory, and one or more programs stored in the at least one memory, wherein the one or more programs are configured to be executed by the one or more processors, the one or more programs including instructions for generating one or more velocity models by processing a set of modeling data that corresponds to the subsurface three-dimensional formation, wherein the one or more velocity models includes a first set of velocity values for a region that is substantially proximate to the physical body; generating one or more effective stress estimates for the region that is substantially proximate to the physical body; and predicting a second set of velocity values for the region that is substantially proximate to the physical body by extrapolating one or more revised velocities based at least in part on the one or more velocity models, the one or more effective stress estimates, and a rock physics template.

In accordance with some embodiments, a computer readable storage medium having a set of one or more programs including instructions that when executed by a computing system cause the computing system to: generate one or more velocity models by processing a set of modeling data that corresponds to the subsurface three-dimensional formation, wherein the one or more velocity models includes a first set of velocity values for a region that is substantially proximate to the physical body; generate one or more effective stress estimates for the region that is substantially proximate to the physical body; and predict a second set of velocity values for the region that is substantially proximate to the physical body by extrapolating one or more revised velocities based at least in part on the one or more velocity models, the one or more effective stress estimates, and a rock physics template.

In accordance with some embodiments, a system includes at least one processor, at least one memory, and one or more programs stored in the at least one memory; and means for generating one or more velocity models by processing a set of modeling data that corresponds to the subsurface three-dimensional formation, wherein the one or more velocity models includes a first set of velocity values for a region that is substantially proximate to the physical body; means for generating one or more effective stress estimates for the region that is substantially proximate to the physical body; and means for predicting a second set of velocity values for the region that is substantially proximate to the physical body by extrapolating one or more revised velocities based at least in part on the one or more velocity models, the one or more effective stress estimates, and a rock physics template.

In accordance with some embodiments, an information processing apparatus for use in a computing system includes means for generating one or more velocity models by processing a set of modeling data that corresponds to the subsurface three-dimensional formation, wherein the one or more velocity models includes a first set of velocity values for a region that is substantially proximate to the physical body; means for generating one or more effective stress estimates for the region that is substantially proximate to the physical body; and means for predicting a second set of velocity values for the region that is substantially proximate to the physical body by extrapolating one or more revised velocities based at least in part on the one or more velocity models, the one or more effective stress estimates, and a rock physics template.

In some embodiments, an aspect of the invention involves generating a first velocity model based on the first rock physics template.

In some embodiments, an aspect of the invention involves updating the first velocity model based on tomographic data corresponding to the first seismic data volume.

In some embodiments, an aspect of the invention involves calculating one or more anisotropic parameters based on one or more criteria selected from the group consisting of rock physics, geology and seismic gathers; and constraining the first velocity model based on the first rock physics template.

In some embodiments, an aspect of the invention involves refining the first rock physics template based on the geologic interpretation.

In some embodiments, an aspect of the invention involves performing migration on the first seismic data volume based on the first rock physics template.

In some embodiments, an aspect of the invention involves calibrating one or more of the set of one or more depth dependent velocity and one or more bulk density curves.

In some embodiments, an aspect of the invention involves the first seismic data volume containing one or more seismic gathers.

In some embodiments, an aspect of the invention includes that revision of the initial velocity model includes performing one or more iterations of tomography to increase relative flatness of at least one of the one or more seismic gathers.

In some embodiments, an aspect of the invention involves performing one or more iterations of migration on at least one of the one or more seismic gathers.

In some embodiments, an aspect of the invention involves determining whether at least one of the one or more seismic gathers is flatter than a predetermined flatness threshold.

In some embodiments, an aspect of the invention involves updating the rock physics template when the determination of whether at least one of the one or more seismic gathers met the predetermined flatness threshold is negative.

In some embodiments, an aspect of the invention includes that the rock physics template is based at least in part on a geologic interpretation.

In some embodiments, an aspect of the invention involves performing one or more post-stack enhancements to the first seismic data volume when the determination of whether at least one of the one or more seismic gathers met the predetermined flatness threshold is positive.

In some embodiments, an aspect of the invention involves preparing a migrated image.

In some embodiments, an aspect of the invention involves estimating one or more metrics selected from the group consisting of pore pressure, fracture pressure, overburden pressure, rock type, fluid type, porosity, and density, wherein the one or more metrics are estimated based at least in part on the revised velocity model.

In some embodiments, an aspect of the invention includes when the one or more metrics are estimated as a function of depth.

In some embodiments, an aspect of the invention includes when the one or more metrics are estimated as a function of two-way travel time.

In some embodiments, an aspect of the invention includes when the migration is isotropic migration.

In some embodiments, an aspect of the invention includes when the migration is anisotropic migration.

In some embodiments, an aspect of the invention includes that the modeling data includes one or more metrics corresponding to characteristics of the subsurface three-dimensional formation, and wherein the modeling data is selected from the group consisting of lithology, porosity, effective stress, and, temperature.

In some embodiments, an aspect of the invention includes that the one or more velocity models are disposed in a velocity cube.

In some embodiments, an aspect of the invention includes that generation of the one or more effective stress estimates includes compensating for effective stress changes due one or more considerations selected from the group consisting of overburden changes, increased heat flows through physical body, and rock properties.

In some embodiments, an aspect of the invention involves refining the one or more velocity models for subsequent processing using models corresponding to the subsurface three-dimensional formation.

In some embodiments, an aspect of the invention involves refining the one or more velocity models for subsequent processing using one or more tomographic velocities.

In some embodiments, an aspect of the invention involves performing one or more iterations of migration on the set of modeling data based on the second set of velocity values.

Thus, the systems and methods disclosed herein are faster, more efficient methods for building velocity models prior to migration. These systems and methods increase migration effectiveness, efficiency, and accuracy. Such methods and interfaces may complement or replace conventional methods for building velocity models prior to migration.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

FIG. 4A illustrates an interpreted seismic section and input to a rock physics guided template in accordance with some embodiments.

FIGS. 5A and 5B illustrate exemplary curves depicting effective stress and bulk density, respectively, in relation to temperature.

FIGS. 6A and 6B illustrate exemplary rock physics templates for shale and sandstone in accordance with some embodiments.

FIGS. 7A, 7B, 7C, and 8 illustrate exemplary rock physics templates in accordance with some embodiments.

FIGS. 12A-12B are flow diagrams illustrating a method of generating velocity models using rock guided physics in accordance with some embodiments.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Computing Systems

Figure 1:
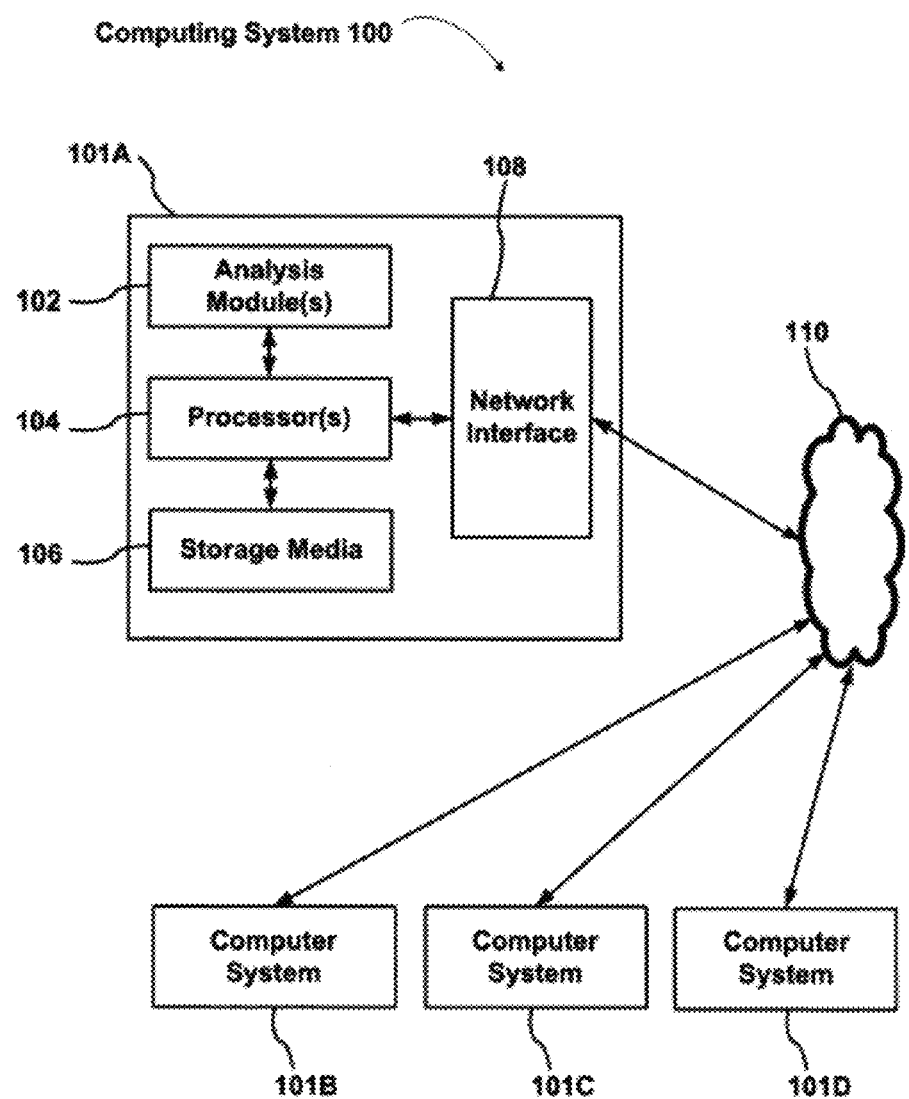
FIG. 1 illustrates a computing system in accordance with some embodiments.

FIG. 1 depicts an example computing system 100 in accordance with some embodiments. The computing system 100 can be an individual computer system 101A or an arrangement of distributed computer systems. The computer system 101A includes one or more analysis modules 102 that are configured to perform various tasks according to some embodiments, such as the tasks depicted in FIGS. 3A, 3B, 9, 11A-11C, 12A-12B and 13. To perform these various tasks, analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the exemplary embodiment of FIG. 1 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the exemplary embodiment of FIG. 1, and/or computing system 100 may have a different configuration or arrangement of the components depicted in FIG. 1. The various components shown in FIG. 1 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Exemplary Equations for Use with Rock Physics Guided Migration

Attention is now directed to examples of some equations that can be used to calculate, estimate, or derive various metrics in the workflows discussed here.

In some embodiments, hydrostatic pressure can be calculated, estimated, and/or derived from equation 1, which can be expressed as:

$$P_{hyd}(z) = c\rho_f z$$

where $P_{hyd}(z)$ represents hydrostatic pressure, $\rho_f$ represents fluid density (e.g., water), and z represents depth.

In some embodiments, overburden stress can be calculated, estimated, and/or derived from equation 2, which can be expressed as:

$$P_{ob}(z) = c\left(\int_{z_0}^{z} \rho(z)dz\right) + c\rho_f z_0 + P_{air}$$

where $P_{ob}$ represents overburden pressure, $\rho_f$ represents fluid density (e.g., water), $\rho$ represents bulk density of the formation or sediment, $z_0$ represents depth of the water column, $P_{air}$ represents pressure due to the air column above the water surface, and z represents depth.

In some embodiments, effective stress can be calculated, estimated, and/or derived from equation 3, which can be expressed as:

$$\sigma_{eff}(z) = P_{ob}(z) - P_p(z)$$

where $\sigma_{eff}$ represents effective stress, $P_{ob}$ represents overburden pressure, and $P_p$ represents pore pressure.

In some embodiments, velocity-effective stress can be calculated, estimated, and/or derived from equation 4, which can be expressed as:

$$Vp(z) = Vp(\sigma_{eff}(z))$$

where Vp represents compressional P wave velocity, $\sigma_{eff}$ represents effective stress, and z represents depth.

Exemplary Isotropic Migration Workflow

Attention is now directed towards embodiments of methods and associated processes for building velocity models prior to migration that may be implemented on a computing system such as computing system 100 of FIG. 1.

In one aspect, an exemplary processes of building velocity models before migration using an isotropic prestack migration workflow is illustrated. However, neither the techniques disclosed herein, nor this embodiment in particular, are restricted to this specific migration process; rather, the disclosed embodiments can be applied successfully to any migration procedure.

Figure 2:
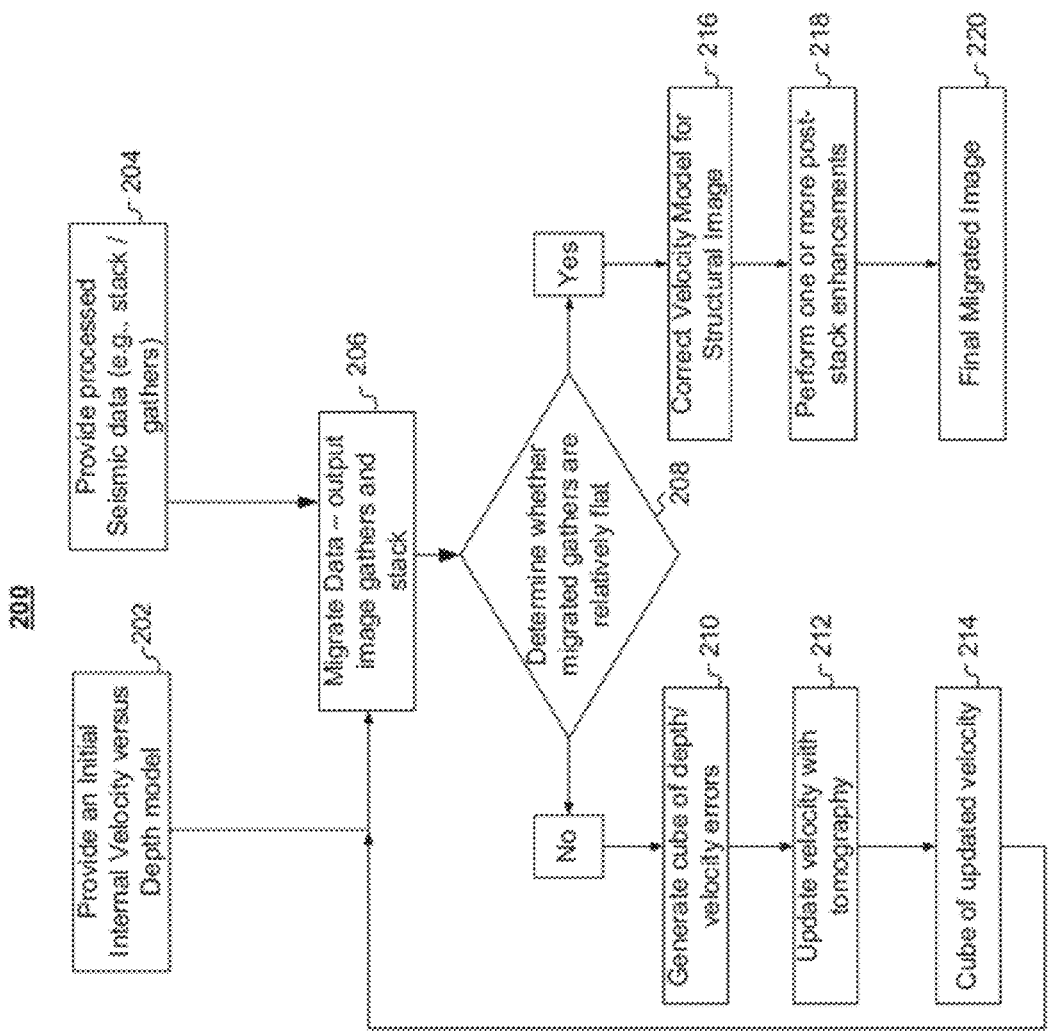
FIG. 2 illustrates an Isotropic Migration workflow in accordance with some embodiments.

FIG. 2 illustrates a typical isotropic migration workflow 200. An initial internal velocity model 202 and pre-processed seismic data 204 (such as stacks and/or gathers) are provided for a data migration 206, which outputs image gathers. Step 208 determines whether migrated gathers are flat, or in some embodiments, relatively flat; note that this determination can be performed algorithmically in light of a predefined flatness threshold, or the flatness determination can be made by a person evaluating the data.

When the determination 208 is made that that the migrated gathers are not sufficiently flat, a potentially iterative process flow is undertaken that focuses on creating a cube with appropriate velocities. This process flow can include various steps, such as: 1) generating a cube of depth and/or velocity errors 210; 2) updating velocities in light of tomography information 212; and 3) creating a cube with updated velocities. The workflow then proceeds to data migration 206 to output revised image gathers based on the cube with updated velocities. This process can be iterated as many times as desired until the migrated gathers are sufficiently flat.

When the determination 208 is made that that the migrated gathers are sufficiently flat, a process flow is undertaken to generate a final migrated image. This process flow can include various steps, such as: 1) correcting the velocity model to generate an image that is consistent with subsurface geology 216; 2) performing one or more post-stack enhancements 218; and 3) generating a final migrated image 220.

In sum, workflow 200 includes two key features: 1) the workflow starts with an initial velocity model and considers whether the seismic gathers are flat; and 2) a series of steps are undertaken to update the velocity model using tomography if the seismic gathers are not flat. The tomography addresses a specific point, namely, a subsurface point at a given point in the earth must image at the same depth when seismic waves from all offsets are depth migrated. Deviations in the migrated image are converted into traveltime errors through the earth model. The model is then updated to minimize these traveltime errors.

Results based on the exemplary workflow of FIG. 2 (and variations of this workflow) have failed to account for several important effects, e.g., presence of various rocks (lithology) in the subsurface, the pressure and temperature state of rocks in the subsurface, and the burial history that rocks have gone through during creation of an initial interval velocity model. Further, determining gather flatness is a necessary, but insufficient, criterion for building a velocity model that should reflect true rock velocity.

The techniques and methods in this disclosure provide a flexible approach to reduce or overcome these shortcomings. These techniques and methods can be used to produce not only a structural image that is consistent with the geology, but they can also be used to ascertain velocities that are closer to true earth velocities. Accordingly, they can also be used to ascertain earth properties such as pore pressure, lithology, etc., as discussed in greater detail below.

Isotropic Migration Workflow Using Rock Physics Guided Migration

Figure 3A:
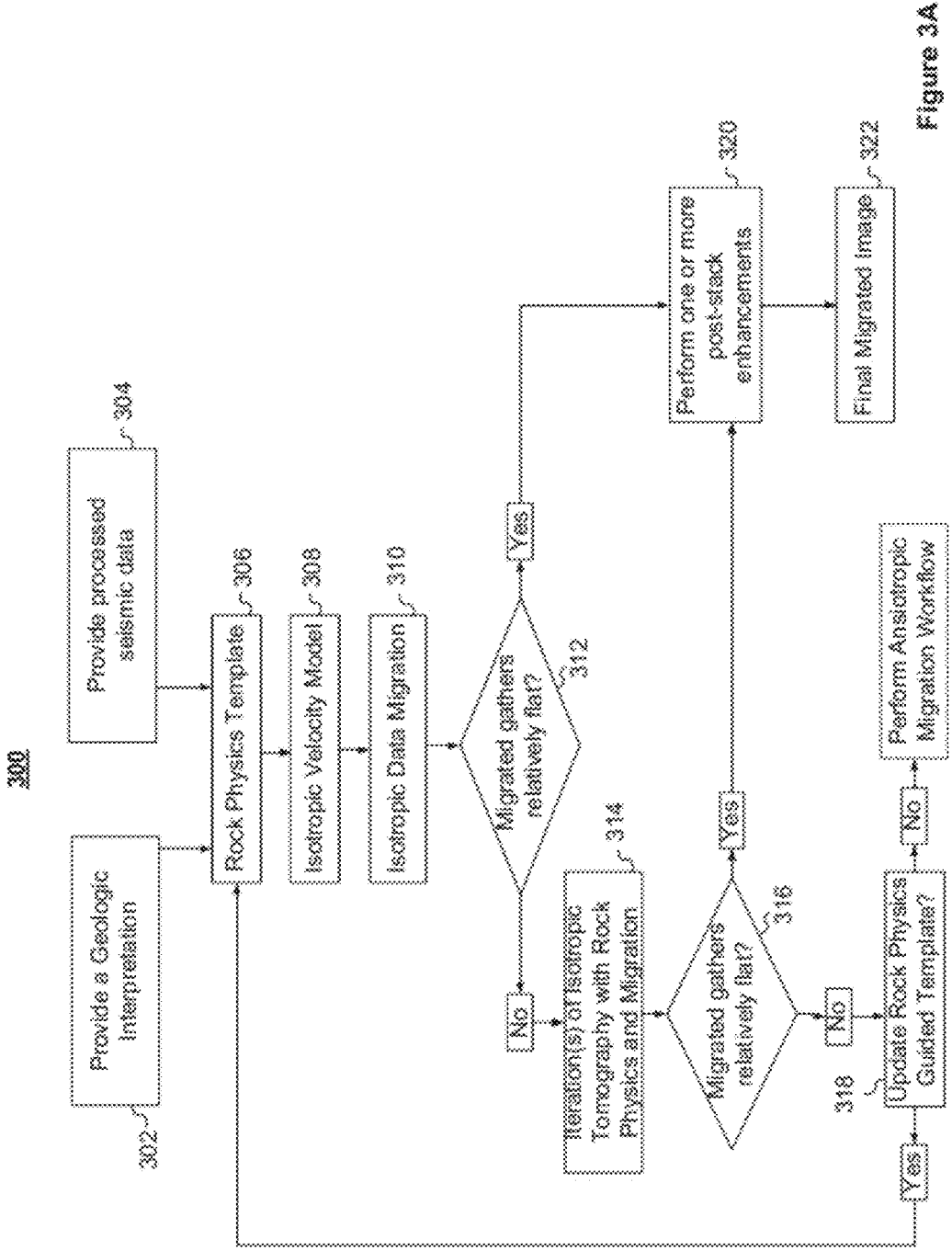
FIG. 3A illustrates an Isotropic Migration workflow utilizing a rock physics guided template in accordance with some embodiments.

Attention is now directed to FIG. 3A, which illustrates an exemplary workflow 300 for isotropic migration with rock physics according to some embodiments. This workflow can be referred to as rock physics guided migration.

One aspect of the exemplary workflow in FIG. 2 (or in typical variations of the workflow of FIG. 2) is that the workflow does not constrain the velocity models generated and/or refined either before or after tomographic inversion. Thus, velocity models generated with workflows such as that illustrated FIG. 2 may be inconsistent with the actual geology, e.g., rock and fluid properties, pressure state at depth, etc., can be at odds with the actual underlying geologic formation.

In the exemplary workflow 300 of FIG. 3A, however, a rock physics template is generated for use in creating velocity models that are more consistent with the actual underlying geologic formation. A rock physics template may include a number of features, such as the velocity versus depth trends of various expected subsurface rock types, e.g. including, but not limited to, sand, shale, basalt, carbonate, etc. Using a rock physics template as a guide—both while building initial velocity model(s), as well as after updating the velocity model(s) with tomography—yields velocity model(s) that are more consistent with the actual underlying geologic formation. Rock physics templates are described below in greater detail, but attention is now directed to describing aspects of the exemplary workflow 300 of FIG. 3A.

In workflow 300, a geologic interpretation (302) and processed seismic data that corresponds to a subterranean region (304) are provided to generate one or more rock physics templates 306 (e.g., through one or more of the processes described herein, such as the exemplary method 350).

In some embodiments, the geologic interpretation 302 may include one or more of these exemplary non-limiting factors: lithology information, geological time data, temperature information and/or geothermal gradients, water depth, seabed properties, and near-surface profile information.

In some embodiments, the processed seismic data 304 may be provided at a high resolution, and may be presented as a stack or as gathers that have not yet been migrated. In alternate embodiments, the seismic data may have undergone one or more iterations of migration, however.

While rock physics templates will be described in greater detail below, rock physics template 306 includes at least a range of acceptable velocities for one or more rock types believed to be in the subterranean region.

The rock physics template(s) is utilized to generate an isotropic velocity model (308), which is then used to perform isotropic data migration (310) on the seismic data. Any suitable technique may be performed for migration, including but not limited to the migration algorithms discussed in this disclosure. Note that in some instances, migration velocities calculated during isotropic migration can fall outside the scope of the rock physics templates, thus requiring additional evaluation and oversight of the process.

The migrated gathers are evaluated to determine if they are flat (312). In some embodiments, the determination is to see whether the migrated gathers are relatively flat, while in alternate embodiments, the determination is to see whether the migrated gathers are flatter than a predetermined flatness threshold. As noted above, this determination can be performed algorithmically in light of a predefined flatness threshold, or the flatness determination can be made by a person evaluating the data.

If the migrated gathers are not sufficiently flat yet, one or more iterations of isotropic tomography and/or migration are performed using the rock physics template(s) (314). Another analysis to determine flatness (316) is performed as described in step 312.

If flatness determination 316 is negative, a determination is made whether to update the rock physics template (318). In some embodiments, a rock physics template is initially constructed based at least in part on known and/or assumed geological facts and characteristics of the subterranean region under study. As those with skill in the art will appreciate, however, the known and/or assumed geological facts and characteristics may be deemed inaccurate after analysis begins. In that circumstance, one or more potential errors or invalid assumptions used to initially construct the rock physics template will be corrected and/or adjusted so that the rock physics template can be updated.

If an update to one or more template(s) is performed, the workflow 300 transitions back to step 306 to update the rock physics template. If the template is not to be updated, the workflow 300 may be terminated so as to perform anisotropic migration if appropriate. An exemplary anisotropic migration workflow guided by rock physics is described in detail below and in FIG. 9.

If the flatness determinations in either steps 312 or 316 is positive, however, the flow transitions to performing one or more post-stack enhancements (320) so as to create the final migrated image (322).

While not depicted in workflow 300, those with skill in the art will understand that an initial velocity model may be provided as input to the workflow before generation of isotropic velocity model 308, and that initial velocity model may be refined in an iterative fashion as part of workflow 300; the concept of iterative refinement of velocity models and/or rock physics models will be described in greater detail below.

Building Rock Physics Templates for Velocity Modeling

Figure 3B:
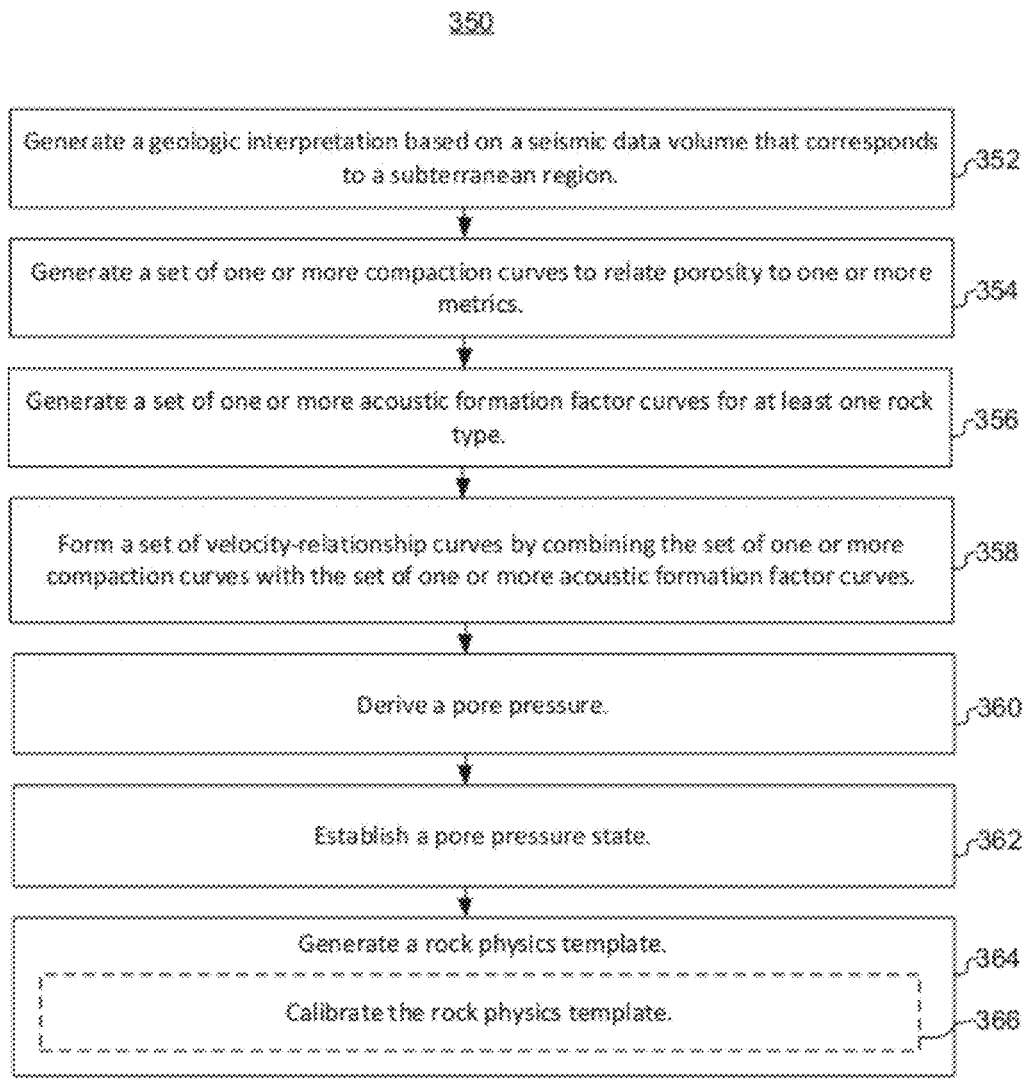
FIG. 3B illustrates a method of generating a rock physics template in accordance with some embodiments.

According to one embodiment, a seven-step process is utilized to generate a rock physics template for velocity modeling. FIG. 3B summarizes at a high-level an exemplary embodiment of this method.

Method 350, which may be performed by any suitable techniques, including on an automated or semi-automated basis on computing system 100 in FIG. 1, begins with generation of a geologic interpretation based on a seismic data volume that corresponds to a subterranean region (352). Next, a set of one or more compaction curves to relate porosity to one or more metrics is generated (354). A set of one or more acoustic formation factor curves for one or more rock types is generated (356), and taking these into account, a set of velocity-relationship curves is formed by combining the set of one or more compaction curves with the set of one or more acoustic formation factor curves (358). A pore pressure is derived (360), and is used in conjunction with other information to establish a pore pressure state (362). Utilizing the information derived already, and other useful information as warranted, a rock physics template is generated (364), and in some cases, calibrated (366).

Attention is now directed to additional details related to various embodiments of rock physics template generation for migration purposes.

A geologic interpretation is made based on a conventional seismic data volume (e.g., step 352 in FIG. 3B). Geologic interpretations can include a description of faults, folds, horizons and reflective or refractive surfaces, as well as information on rock types such as salt, basalt, shale, sand, carbonates, etc. At this stage, other information can also be accumulated. For example, in some embodiments, an analysis of ages of various rock types from interpretation (e.g., chronostratigraphy) of seismic data is collected. In some embodiments, estimates of temperature gradients of various geologic strata are generated (e.g., from heat flow calculations). The non-limiting example of FIG. 4A depicts an example of an interpreted seismic section 400 for rock physics guided migration that has been interpreted with lithology (probable rock types 401-1-401-5), estimated or potential age in millions of years (age estimates 402-1-402-8), and temperature data (temperature estimates 403-1-403-9).

Figure 4B:
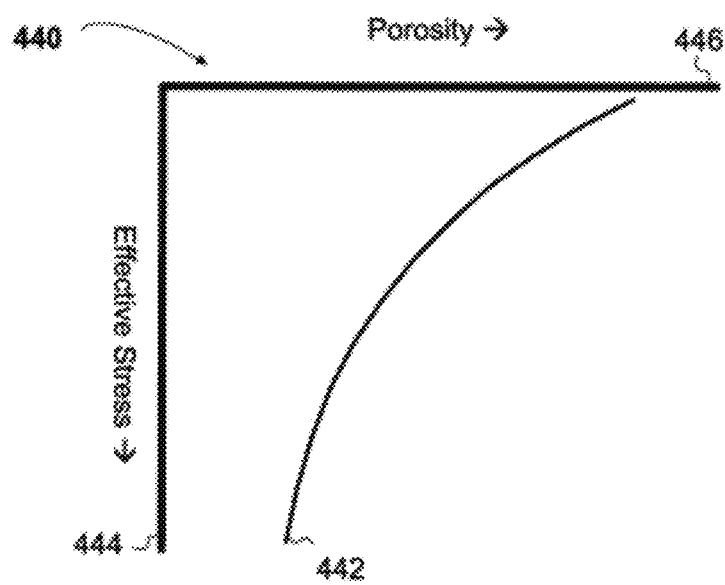
FIG. 4B illustrates a compaction curve in accordance with some embodiments.

A set of one or more compaction curves are generated to relate porosity (i.e., void space in the rock that is filled with fluid) or some function relating to porosity with one or more of the following exemplary, but non-limiting metrics: effective stress, temperature, burial history (i.e., geologic time) and rock type (e.g., step 354 in FIG. 3B). In accordance with some embodiments, an exemplary compaction curve plot 440 is illustrated in FIG. 4B, and includes a compaction curve 442 plotted against effective stress axis 444 and porosity axis 446. Note that while no units of measure are depicted in the exemplary plot 440, any suitable scale may be used in practice.

Here, the effective stress is the difference between the overburden pressure due to some or all of the rock/fluid layers above a layer of rock and the pressure exerted by the pore fluid that is within that layer of the rock. At this stage a burial history simulation of one or more rock types can be performed to account for the effect of geologic time and temperature on the porosity (or a function of porosity) of a given rock layer. This can help account for various diagenetic processes that impact porosity. One example is the burial metamorphism of shale resulting from conversion of Smectite to Illite (Dutta; 1987; Dutta; 1986). A second example is the cementation of sands due to transport of various minerals and subsequent aggregation on rock grains that reduces porosity over geologic time. Yet a third example is the reduction or buildup of porosity (secondary porosity) in carbonate rocks due to various chemical processes, including but not limited to, cementation and dissolution.

For one or more rock types identified in the geologic interpretation (i.e., FIG. 3B step 352), a set of one or more acoustic formation factor curves are generated (e.g., step 356 in FIG. 3B). These curves typically relate rock velocity and/or "slowness" (i.e., the inverse of rock velocity) to porosity or some function(s) related to porosity, (e.g., void ratio, which is a ratio of pore volume to rock volume) for a given rock type.

In some embodiments, a modified version of the model proposed by Raiga-Clemenceau et al (1988) is used. In some circumstances, the model can be modified to account for porosities larger than a "critical porosity" (which is defined as a porosity at which a mixture of sand, silt, clays, etc. and water are compacted to the extent that the mixture begins to bear an overburden load). In such a case, the model is modified and extended to account for porosities greater than the critical porosity for the body in question. As a non-limiting example, an average of upper and lower bounds can be used (e.g., techniques disclosed in Hashin-Shtrickman (1963)) so that the acoustic formation factors are valid all the way up to 100% porosity. For marine streamer data, this can occur at the sea-bed level. As those skilled in the art will appreciate, however, there are various other ways to address this issue, including the non-limiting examples of determining travel time averages, mixing moduli, etc.

Figure 4C:
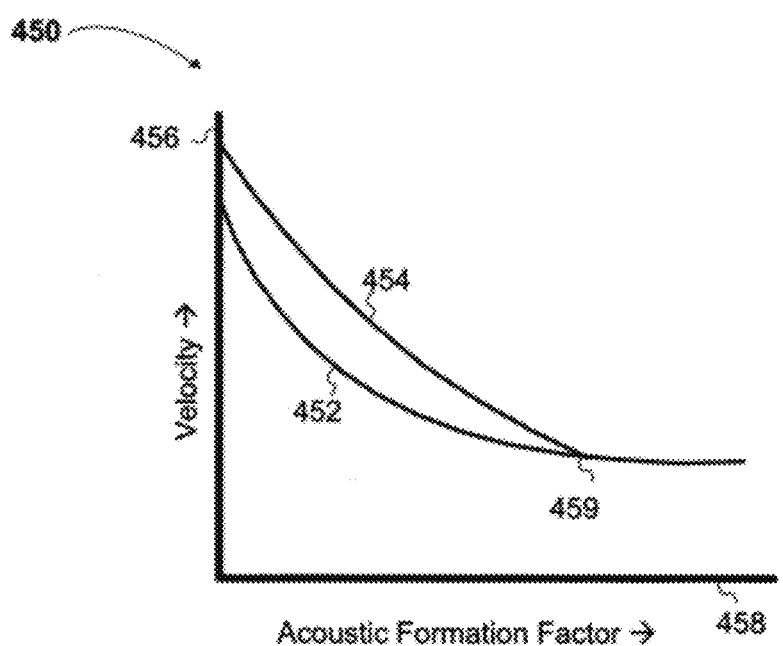
FIG. 4C illustrates an acoustic formation factor curve in accordance with some embodiments.

In accordance with some embodiments, an exemplary acoustic formation factor curve plot 450 as illustrated in FIG. 4C includes a sand curve 452 and a shale curve 454 plotted against velocity axis 456 and acoustic formation factor axis 458. A critical porosity point 459 can be determined from the intersection of the sand curve 452 and the shale curve 454. Note that while no units of measure are depicted in the exemplary plot 450, any suitable scale may be used in practice. Further, while the plot 450 relates sand and shale, plots for other combinations of substances can be formed using analogous techniques.

Velocity-relationship curves are formed (e.g., FIG. 3B step 358) by combining one or more of the compaction curves from step 354 with one or more of the acoustic formation factor curves from step 356 to yield a set of new curves that relate rock velocity, or what may be referred to as "slowness," to effective stress and/or temperature for one or more rock types. An example is given in FIG. 5A, which illustrates plot 500 of curves 501-1 through 501-9 on effective stress axis 502 against a "slowness" axis 503 as a function of temperature 504. In some embodiments, the porosity from step 356 is used to compute bulk density from seismic velocity and the local geology as defined in step 352.

Upon integration, an overburden versus depth relationship is obtained. An example is given in FIG. 5B, which illustrates plot 506 of curves 507-1 through 507-9 against bulk density axis 508 and "slowness" axis 509 for various temperatures 510.

A pore pressure is derived (e.g., FIG. 3B step 360). In one embodiment, pore pressure is derived by subtracting effective pressure from overburden pressure. As a non-limiting example, in this embodiment, Terazaghi's Principle is used to derive pore pressure that is the difference between the overburden pressure and effective pressure. Biot's consolidation coefficient is used as unity, i.e., 1.0. As those skilled in the art will appreciate, however, the use of Terazaghi's Principle and a specific value of Biot's consolidation coefficient in this embodiment is not required to derive the pore pressure, because any suitable technique may be employed.

A pore pressure state can be established (e.g., FIG. 3B step 362), based at least in part on the relationships from steps 358 and 360 of FIG. 3B. For example, given a temperature profile of a rock type and/or its burial history (e.g., Duda 1987), one can associate a rock velocity with its effective stress, and hence, estimate a pore pressure state. This is the basis of pore pressure analysis using velocity data in this exemplary embodiment.

An example of establishing a pore pressure state is illustrated in FIGS. 5A and 5B. FIGS. 5A and 5B compare various "slowness" factors. As noted above, FIG. 5A illustrates plot 500 of curves 501-1 through 501-9 on effective stress axis 502 against a "slowness" axis 503 as a function of temperature 504. FIG. 5B illustrates plot 506 of curves 507-1 through 507-9 against a bulk density axis 508 against a "slowness" axis 509 for various temperatures 510.

While the velocity-relationship curves of FIGS. 5A and 5B can be used to relate velocity with effective stress, geological time, and/or temperature (e.g., "slowness" as discussed above) these figures also demonstrate a pore pressure state since: 1) velocity is a function of porosity; 2) porosity is a function of effective stress; and 3) elimination of porosity yields velocity as a function of effective stress, which thus demonstrates a pore pressure state.

A rock physics template can be generated by taking into account some or all of the information already derived (e.g., FIG. 3B step 362). A rock physics template can include a set of depth dependent velocity and/or bulk density curves for one or more rock types given the temperature versus depth at a location within the 3D geologic space. In this exemplary rock physics guided migration workflow embodiment, we turn the relationship from FIG. 3B step 362 "backwards": namely, given a temperature and its effective pressure state of a rock, the velocity of that rock is predicted. These are some exemplary representations of rock velocity versus depth for one or more rock types in a basin, given effective stress and temperature conditions as discussed above.

In some embodiments, a variation of these curves can also be generated in which rock velocity for a given rock type (and thermal gradient) is displayed as a function of pore pressure in pounds per gallon. An upper limit of such a set of rock velocity versus depth curves are those appropriate under hydrostatic pressure conditions for each rock type. A lower limit is also indicated based on the elevated pressure that is so high as to cause "hydraulic fracture" of a particular rock type. The resulting rock physics templates depict a set of velocity versus depth curves starting from lowest pore pressure condition ("hydrostatic") to any pore pressure that is higher than the hydrostatic up to and including a "fracture pressure."

Exemplary rock physics templates for shale and sandstone are depicted in FIGS. 6A and 6B.

FIG. 6A illustrates shale rock physics template 600 that includes curves 601-1 through 601-10 plotted on depth axis 602 versus velocity axis 603. Curves 601-1 through 601-10 correspond to various readings in pounds per gallon that increase with slower velocities, e.g., curve 601-1 represents hydrostatic, curve 601-2 represents 9 pounds per gallon, curve 601-3 represents 10 pounds per gallon, up through curve 601-10 that represents 17 pounds per gallon. Also depicted in FIG. 6A is unconstrained seismic velocity field 605 that was derived tomographically without benefit of rock physics-based constraints.

FIG. 6B illustrates shale rock physics template 610 that includes curves 611-1 through 611-10 plotted on depth axis 612 versus velocity axis 613. Curves 611-1 through 611-10 correspond to various readings in pounds per gallon that increase with slower velocities, e.g., curve 611-1 represents hydrostatic, curve 611-2 represents 9 pounds per gallon, curve 611-3 represents 10 pounds per gallon, up through curve 611-10 that represents 17 pounds per gallon. Also depicted in FIG. 6B is unconstrained velocity field 615 that was derived tomographically without benefit of rock physics-based constraints, along with hydrostatic sandstone trend line 617.

In some embodiments, the rock physics template is calibrated (e.g., FIG. 3B step 366). Calibration of the template can be performed using any suitable technique or source of pertinent data. In some embodiments, the calibration may include refining one or more curves of the rock physics template in light of well data, including without limitation, velocity from sonic, check shot or VSP, either from the same basin or an analogue basin.

Figure 6C:
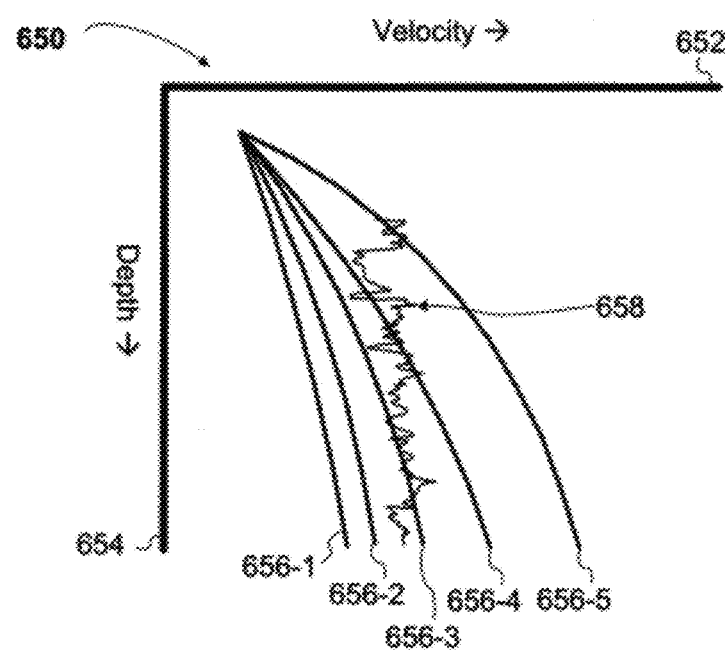
FIG. 6C illustrates a technique for rock physics template calibration in accordance with some embodiments.

A non-limiting example of rock physics template calibration is illustrated in FIG. 6C. In this example, a plot 650 with a velocity axis 652 and a depth axis 654 includes a set of depth-dependent velocity curves 656-1 through 656-5, where the pressure represented by curve 656-1 is higher than the pressure represented by curve 656-5. Sonic log 658 is superimposed on plot 650 to permit evaluation and adjustment of the curves as appropriate.

In another embodiment, less accurate rock physics template(s) may also be created and used in the disclosed workflows to guide migration. In this alternate embodiment, one can use any of the well known methods such as Eaton (1995), Bowers (1995), Eberhardt-Phillips (1990), etc, that relate velocity to effective stress for various rocks or create a curve that relates velocity to effective stress based on scatter plots from well data. Once suitable curves are created, an "anchor" point is determined to relate velocity to a known fluid pore pressure (or a known effective stress) for a given rock type. This "anchor" point could be the "hydrostatic pore pressure" (also known as the normal compaction trend) or a known elevated pressure state where pressure measurements are taken in a borehole. Once this "anchor" point is determined, a series of effective stress versus velocity curves for that rock type for any elevated pore pressure state can be created. The process can then be repeated for any other rock types to create templates such as those shown above.

FIGS. 7A-7C illustrate examples of some methods for generating less accurate rock physics templates that may be subsequently used to guide migration (i.e., Eaton, Bowers, and Everhardt-Phillips, respectively). In each of these cases, a Normal Compaction Trend (NCT) is created (as illustrated by NCT lines 701, 702, and 703, in FIGS. 7A-7C, respectively). From this "anchor" point in any of these types of methods, one can generate a trend (velocity versus depth profile) for any other pressure states. An additional example is given in FIG. 8 from the well known work of Pennebaker (1968) where the trends for shale are given in a particular basin.

In the approach for migration guided by rock physics, such trends can also be used to construct a rock physics template as shown above and used to constrain the velocity model building prior to migration.

Anisotropic Depth Migration Using Rock Physics Guided Migration

Figure 9:
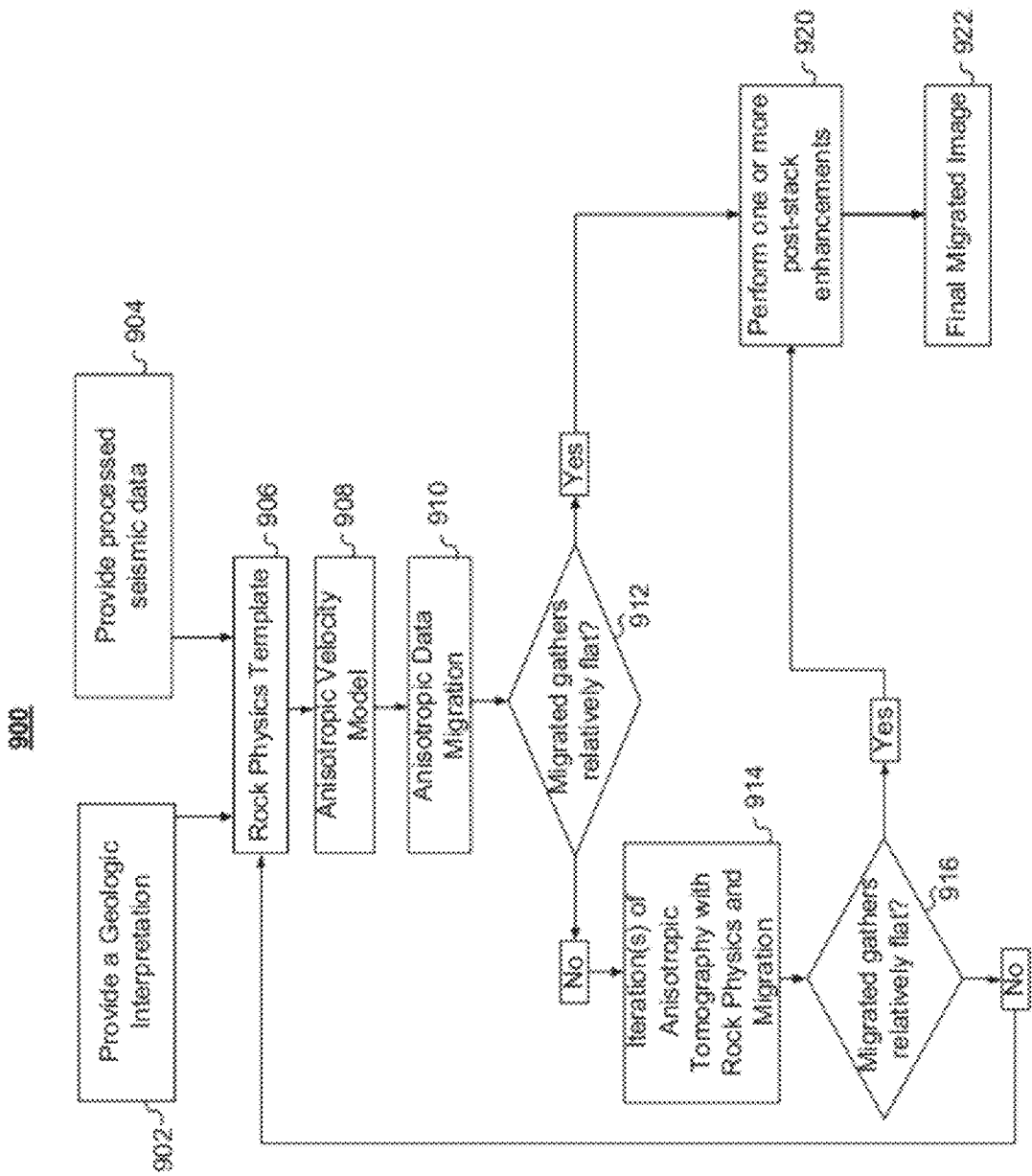
FIG. 9 illustrates an Anisotropic Migration workflow utilizing a rock physics guided template in accordance with some embodiments.

FIG. 9 illustrates an exemplary workflow 900 for anisotropic migration guided by rock physics in accordance with some embodiments.

In workflow 900, anisotropic parameters are calculated using basic principles, including without limitation one or more of the following: rock physics, geology and seismic gathers. One aim is to create an acceptable range of anisotropic parameters that are "reasonable" (e.g., identify known parameter ranges for various rock types), and to use these parameters in conjunction with the rock physics template to constrain the velocity field before tomography and migration. Further, at one or more stages of the tomography, the ensuing velocity fields can be constrained by rock physics templates. When a convergence criterion is met, the iteration loop for tomography and inversion can be terminated, and post stack enhancements may then be performed. One aim of final output is a structurally consistent image that also provides a velocity field suitable for predicting criteria such as pore pressure and other metrics that are not generally considered part of imaging.

The exemplary workflow 900 is structured in a similar fashion to the isotropic workflow 300 discussed above, and as such, will not be described in detail here. The principal differences are that: 1) anisotropic techniques are used instead of isotropic techniques, e.g., an anisotropic velocity model 908 is input to anisotropic data migration 910, rather than the isotropic velocity model 308 which is input to isotropic data migration 310 as in workflow 300; and 2) the rock physics template(s) is not updated in workflow 900 as it was in step 318 and 306 of workflow 300.

The use of rock physics to guide the migration process can enhance structural image quality because rock physics-constrained velocity field(s) is reflective of the true earth velocity (or rock velocity). Thus, seismic energy is focused appropriately to add clarity to a migrated image.

Use of Rock Physics Templates to Build a Velocity Model Before Tomography and Migration FIGS. 10A-10D depict an example showing how a rock physics template is used to guide development of a velocity model in the absence of well log velocities. The application is illustrated using the anisotropic depth migration (VTI KPSDM) workflow as an example for a particular basin where there was no well control.

Figure 10D:
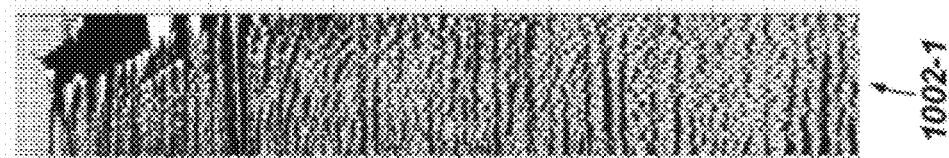
FIG. 10 illustrates an example of the use of rock guided physics for creating a guide function for velocity model building before and after migration in accordance with some embodiments.

FIG. 10D illustrates a PSDM gather before using a rock physics guided migration workflow approach (1002-1). The velocity problems are clearly visible to those with skill in the art. FIG. 10A illustrates the same PSDM gather that has gone through the rock physics guided migration approach (1002-2). The gathers are "flatter" as per the determinations made in exemplary workflow steps 912 and/or 916 in FIG. 9. The relative flatness of the gathers indicates that a better velocity model has been generated. This improvement can be achieved by establishing guide functions and velocity functions as depicted in FIGS. 10B and 10D. These figures illustrate some exemplary aspects of the rock physics guided migration approach to conditioning and/or constraining velocities (FIG. 10C) and the anisotropy parameters epsilon and delta (FIG. 10B). In the velocity panel (FIG. 10C), where velocity increases from left to right, there are four curves that are a result of applications of rock physics templates that were developed according to the methods disclosed herein; these curves are the guide functions.

Figure 10C:
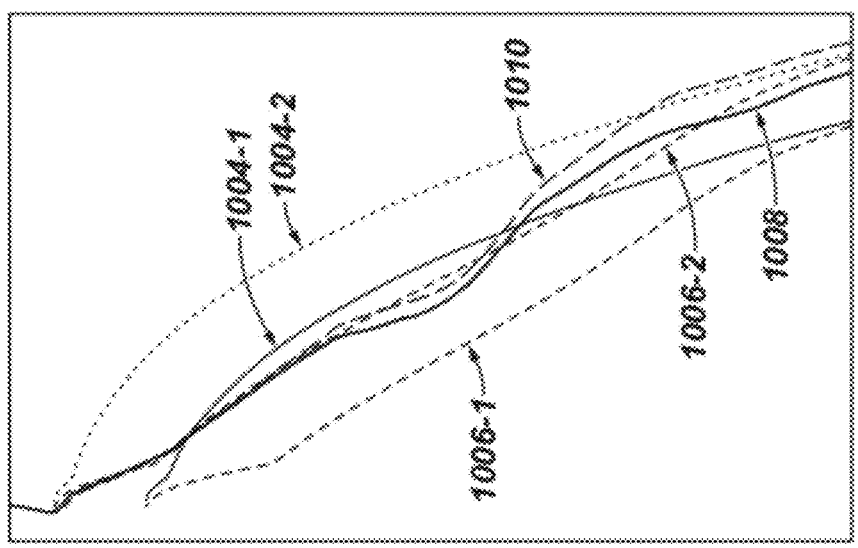
Figure 10B:
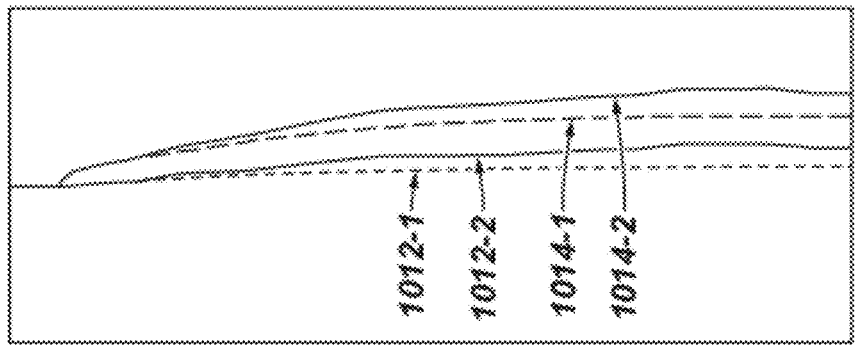
Figure 10A:
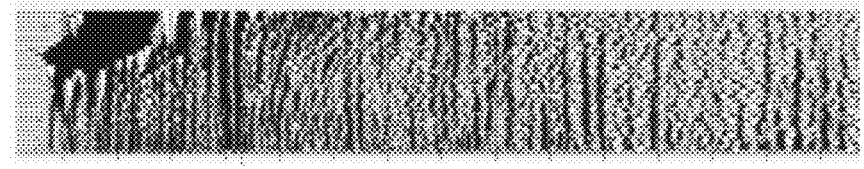

There are four exemplary guide functions depicted in FIG. 10C, i.e., lower and upper bounds on velocities for sand (1004-1 and 1004-2, respectively) and similar bounds for shale (1006-1 and 1006-2, respectively). Additionally, the final velocity function (1008) derived as a result of tomography that used bounds 1004-1, 1004-2, 1006-1, and 1006-2 during an inversion process is illustrated. The velocity functions are and a comparison is made with the imaging velocity that used no such bound (1010, conventional anisotropic depth migration). Those with skill in the art will appreciate that in some instances, rock physics templates can provide highly accurate results during anisotropic modeling when migration is carried out using vertical velocities associated with epsilon and delta parameters. In FIG. 10B, traditional anisotropic parameters (epsilon and delta) are shown for both cases, i.e., with and without rock physics guided migration (1012-1 and 1012-2 illustrate delta with and without rock physics guided migration, respectively; 1014-1 and 1014-2 illustrate epsilon with and without rock physics guided migration, respectively). The improvement in the velocity function after tomographic inversion (FIG. 10C) is substantial, and yields not only an image that is higher quality and more consistent with the actual subsurface geology but also a more accurate velocity profile for pore pressure.

In some embodiments, after the velocity functions are created that satisfy the bounds established by the rock physics templates described in the example above, the model is processed with a tomography algorithm to generate a full three-dimensional velocity volume from travel time inversion of three-dimensional seismic data. The output of that model is a three-dimensional velocity field that is within the rock physics bounds without degrading the structural image. This velocity field can then be processed with any suitable migration algorithm to produce a final structural image that is now consistent with a velocity field, and that is also appropriate for establishing metrics that are outside the context of traditional imaging, such as pore pressure.

Figure 11A:
FIGS. 11A-11C are flow diagrams illustrating a method of using rock guided physics for creating a guide function for velocity model building in accordance with some embodiments.
Figure 11B:
Figure 11C:
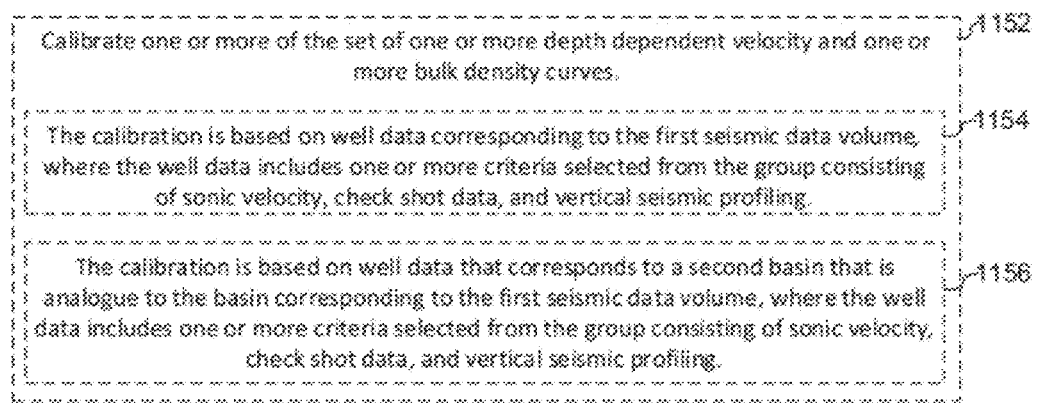

Attention is now directed to FIGS. 11A-11C, which are flow diagrams illustrating a method of building velocity models for migration in accordance with some embodiments. Some operations in method 1100 may be combined and/or the order of some operations may be changed. Further, some operations in method 1100 may be combined with aspects of the exemplary work flows of FIGS. 2, 3A, 3B, and/or 9, and/or the order of some operations in method 1100 may be changed to account for incorporation of aspects of the work flows illustrated by FIGS. 2, 3A, 3B, and/or 9. Additionally, operations in method 1100 may be combined with aspects of methods 1200 and 1300 discussed below, and/or the order of some operations in method 1100 may be changed to account for incorporation of aspects of methods 1200 and 1300.

It is important to recognize that geologic interpretations, rock physics templates, sets of curves, and/or velocity models may be refined in an iterative fashion; this concept is applicable to methods 1100, 1200, and 1300 as discussed herein. This can include use of feedback loops executed on an algorithmic basis, such as at a computing device (e.g., computing system 100, FIG. 1), and/or through manual control by a user who may make determinations regarding whether a given step, action, template, model, or set of curves has become sufficiently accurate for the evaluation of the subsurface three-dimensional geologic formation under consideration (see, e.g., where the exemplary work flows of FIGS. 3A and 9 include an iterative process of multiple steps, including but not limited to forming a rock physics template, generating velocity models, performing migration, evaluating gather flatness, and iterating through tomography and rock physics template updates).

The method 1100 is performed at a computing device (e.g., computing system 100, FIG. 1). For one or more rock types disposed in a subsurface three-dimensional geologic formation, the method includes generating a geologic interpretation based on a first seismic data volume that corresponds to the subsurface three-dimensional geologic formation (1102) (e.g., geologic interpretation block in FIG. 3A; FIG. 3B generation of geologic interpretation 352; geologic interpretation block in FIG. 9).

In some embodiments, generating the geologic interpretation is based on a description of one or more indicia selected from the group consisting of faults, folds, and horizons, and/or reflective or refractive surfaces, and wherein the geologic interpretation for the one or more rock types includes information regarding one or more substances from the group consisting of salt, basalt, shale, sand and carbonate rock types (1104) (e.g., FIG. 4, which depicts an example of a seismic section that has been interpreted with lithology (i.e., probable rock types), age in millions of years, and temperature data; see also, the method of geologic interpretation block in FIG. 3A; the method of geologic interpretation block in FIG. 9).

In some embodiments, generating the geologic interpretation includes analyzing respective ages of one or more rock types (1106), and in further embodiments, the analysis of respective ages includes performing chronostratigraphy (1108).

In some embodiments, generating the geologic interpretation includes estimating one or more temperature gradients of one or more geologic strata (1110), and in further embodiments, estimating the one or more temperature gradients includes performing heat flow calculations (1112).

The method 1100 also includes generating a set of one or more compaction curves (1114) (e.g., FIG. 3B generation of compaction curves 354).

In some embodiments, generating the compaction curves includes relating porosity to one or more criteria selected from the group consisting of effective stress, temperature, burial history, geologic time, and rock type (1116). And in certain embodiments, effective stress is the difference between the overburden pressure due to one or more rock/fluid layers above a first rock layer and the pressure exerted by a pore fluid that is within the first rock layer (1118). In some embodiments, a simulation of a burial history for one or more rock types is performed (1120), and in further embodiments, the simulation of the burial history includes analyzing the effect of geologic time and temperature on the porosity of the first rock layer (1122).

In some embodiments, analyzing the effect of geologic time and temperature includes analyzing one or more diagenetic processes. These diagenetic processes, include, but are not limited to burial metamorphism of a given rock layer, cementation of sands due to transport of various minerals and subsequent aggregation on rock grains that reduces porosity over geologic time, and reduction or buildup of porosity in carbonate rocks due to chemical processes.

The method 1100 proceeds to generating a set of one or more acoustic formation factor curves for at least one of the one or more rock types (1124) (e.g., FIG. 3B generation of acoustic formation factor curves 356).

The method 1100 next transitions to forming velocity-relationship curves. For one or more of the one or more rock types, combining the set of one or more compaction curves with the set of one or more acoustic formation factor curves to form a first set of velocity-relationship curves that relate rock velocity with at least one criteria selected from the group consisting of effective stress and temperature (1126) (e.g., the velocity-relationship curves illustrated in FIG. 5).

Method 1100 further includes deriving a first overburden pressure (1128), and then proceeds to deriving a first pore pressure state using the first overburden pressure and the first set of velocity-relationship curves (1130) (e.g., also illustrated through the velocity-relationship curves illustrated in FIG. 5).

In some embodiments, deriving the first pore pressure state uses Terazaghi's Principle (1132).

Method 1100 then generates one or more rock physics templates, where at least one of the templates has at least a set of one or more depth dependent velocity curves and one or more bulk density curves (1134) (e.g., the shale and sandstone templates as illustrated in FIG. 6).

In some embodiments, a rock physics template may comprise one or more bulk density curves, while in alternate embodiments, a rock physics template may comprise one or more depth dependent velocity curves.

In some embodiments, generation of a rock physics template is based at least in part on the relationship between temperature and/or depth for a given location in a subsurface three-dimensional geologic formation (1136).

In some embodiments, the geologic interpretation generated in step 1102 is refined based on a rock physics template (1138). In some embodiments, refining the geologic interpretation includes generating a velocity model based on a rock physics template (1140).

In some embodiments, a generated velocity model is updated based on tomographic data corresponding to a seismic data volume (1142).

Additionally, in some embodiments, refining a geologic interpretation includes calculating one or more anisotropic parameters based on one or more criteria selected from the group consisting of rock physics, geology and seismic gathers, and/or constraining a generated velocity model based on a rock physics template (1144).

Moreover, in some embodiments, a rock physics template may be refined based on the geologic interpretation that was generated (1146).

In some embodiments, the method 1100 includes performing migration on the first seismic data volume based on the first rock physics template (1148). The migration can be any suitable technique, including any of those selected from the group consisting of Prestack Time Migration (PSTM), Kirchhoff Prestack Depth migration (KPSDM), Prestack Depth migration (PSDM), Reverse Time Migration (RTM), Gaussian Packet Beam Migration (GPM), Wave-equation migration (WEM) and Full Wave Inversion (FWI) (1150).

In some embodiments, the method 1100 may also include calibration of one or more of the set of one or more depth dependent velocity curves and/or one or more bulk density curves (1152). In some of these embodiments, curve calibration may be based on well data corresponding to the first seismic data volume, where the well data includes one or more criteria selected from the group consisting of sonic velocity, check shot data, and vertical seismic profiling (1154). Curve calibration may also be based on well data that corresponds to a second basin that is analogue to the basin corresponding to the first seismic data volume, where the well data includes one or more criteria selected from the group consisting of sonic velocity, check shot data, and vertical seismic profiling (1156).

Figure 12B:
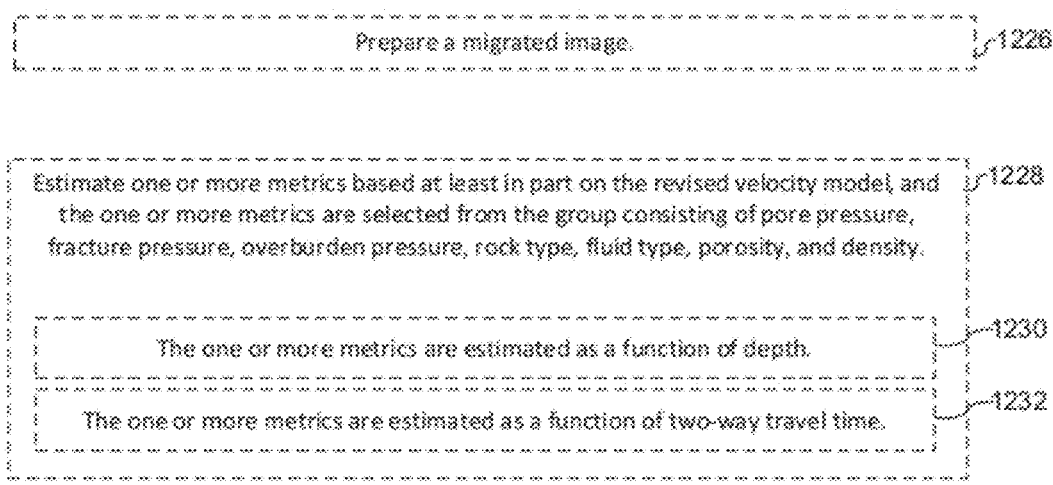

Attention is now directed to FIGS. 12A-12B, which are flow diagrams illustrating a method of building velocity models for migration in accordance with some embodiments. Some operations in method 1200 may be combined and/or the order of some operations may be changed. Further, some operations in method 1200 may be combined with aspects of the exemplary work flows of FIGS. 2, 3A, 3B, and/or 9, and/or the order of some operations in method 1200 may be changed to account for incorporation of aspects of the work flows illustrated by FIGS. 2, 3A, 3B, and/or 9. Additionally, operations in method 1200 may be combined with aspects of methods 1100 and 1300 discussed herein, and/or the order of some operations in method 1200 may be changed to account for incorporation of aspects of methods 1100 and 1300.

The method 1200 is performed at a computing device (e.g., computing system 100, FIG. 1). For at least one rock type disposed in a subsurface three-dimensional geologic formation, the method includes generating an initial velocity model based on a first seismic data volume that corresponds to the subsurface three-dimensional geologic formation (1202) (e.g., FIG. 2 providing an initial velocity model step 202; providing an initial velocity model in workflow 300 as discussed above).

In some embodiments, the first seismic data volume contains one or more seismic gathers (1204).

The method 1200 also includes generating a rock physics template having at least a set of one or more depth dependent velocity curves (1206) (e.g., FIG. 3A rock physics template 306; FIG. 3B workflow 350 and generate a rock physics template step 364; FIGS. 6A and 6B, rock physics templates 600 and 610).

In some embodiments, the rock physics template is based at least in part on a geologic interpretation (1208).

The method 1200 also includes generating a revised velocity model by revising the initial velocity model based at least in part on the rock physics template (1210) (e.g., FIG. 3A, rock physics template 306 utilizes input of geologic interpretation 302).

In some embodiments, revising the initial velocity model includes performing one or more iterations of tomography to increase relative flatness of at least one of the one or more seismic gathers (1212) (e.g., FIG. 3A, iterations of tomography 314, gather flatness determination 316, and loop back through velocity model updating step 308).

In some embodiments, the method 1200 includes determining whether at least one of the one or more seismic gathers is flatter than a predetermined flatness threshold (1214) (e.g., FIG. 3A, gather flatness determinations 312 and 316).

In some embodiments, the method 1200 includes updating the rock physics template when the determination of whether at least one of the one or more seismic gathers met the predetermined flatness threshold is negative (1216) (e.g., FIG. 3A, gather flatness determination 316, and rock physics template updating step 318).

In some embodiments, the method 1200 includes performing one or more iterations of migration on at least one of the one or more seismic gathers (1218) (e.g., FIG. 3A, iterations of migration 314 and 308; FIG. 9 iterations of migration 908 and 914).

In some embodiments, the migration is isotropic migration (1220) (e.g., FIG. 3A, iterations of isotropic migration 314 and 308).

In some embodiments, the migration is anisotropic migration (1222) (e.g., FIG. 9 iterations of anisotropic migration 908 and 914).

In some embodiments, the method 1200 includes performing one or more post-stack enhancements to the first seismic data volume when the determination of whether at least one of the one or more seismic gathers met the predetermined flatness threshold is positive (1224) (e.g., FIG. 3A gather flatness determination 316 and post stack enhancement step 320).

In some embodiments, the method 1200 includes preparing a migrated image (1226) (e.g., FIG. 3A final migrated image generation step 322).

In some embodiments, one or more metrics are estimated based at least in part on the revised velocity model, and the one or more metrics are selected from the group consisting of pore pressure, fracture pressure, overburden pressure, rock type, fluid type, porosity, and density (1228). In some embodiments, the one or more metrics are estimated as a function of depth (1230). In some embodiments, the one or more metrics are estimated as a function of two-way time (1232).

Figure 13:
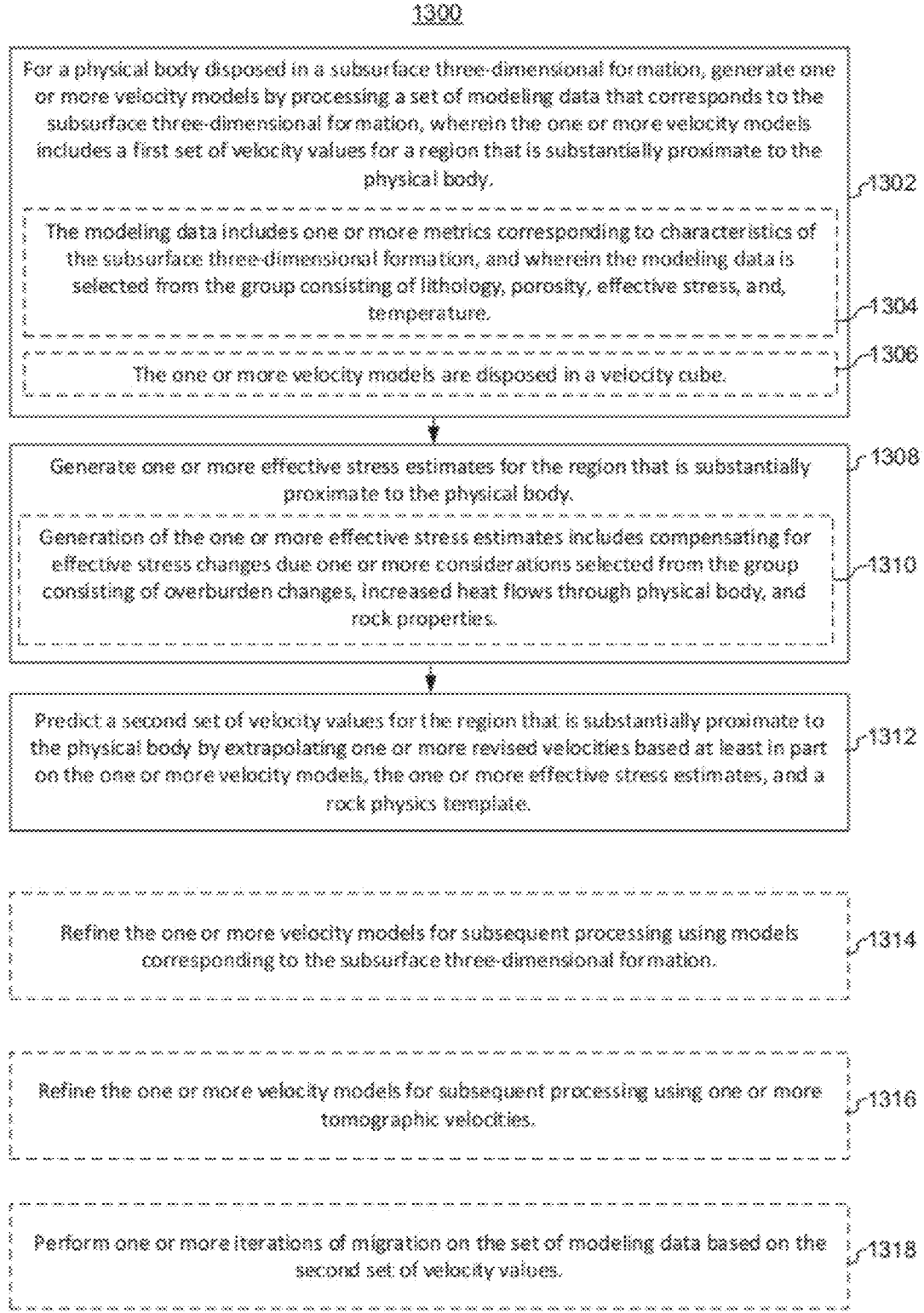
FIG. 13 is a flow diagram illustrating a method of generating velocity models using rock guided physics in accordance with some embodiments.

Use of Rock Physics Templates to Build a Velocity Model for Large-Scale Physical Bodies Attention is now directed to FIG. 13, which is a flow diagram illustrating a method of velocity model building for large-scale hard or fast physical bodies, such as, but not limited to geobodies such as salt-bodies, with rock physics templates in accordance with some embodiments. Some operations in method 1300 may be combined and/or the order of some operations may be changed. Further, some operations in method 1300 may be combined with aspects of the exemplary work flows of FIGS. 2, 3A, 3B, and/or 9, and/or the order of some operations in method 1300 may be changed to account for incorporation of aspects of the work flows illustrated by FIGS. 2, 3A, 3B, and/or 9. Additionally, operations in method 1300 may be combined with aspects of methods 1100 and 1200 discussed above, and/or the order of some operations in method 1300 may be changed to account for incorporation of aspects of methods 1100 and 1200.

As discussed above, velocity model building for large-scale hard or fast geobodies has often been encumbered by deficiencies related to temperature effects and geologic time. Accordingly, in some embodiments, a method to generate velocity fields associated with large-scale hard or fast geobodies, including but not limited to sub-salt regions, can be utilized, and is discussed generally before attention is directed specifically to method 1300.

Initially, a set of modeling data corresponding to a subterranean region is converted to a velocity cube. The modeling data can include, but is not limited to, the exemplary metrics of porosity, effective stress, and/or temperature for various lithologies. In some embodiments, the velocity cube is refined for processing using analogue models corresponding to the subterranean region, or an analogous region. In some embodiments, the velocity cube is refined for processing using one or more tomographic velocities for seismic, e.g., velocities corresponding to a portion of the subterranean region where the salt is very thin.

Velocities from the cube are extrapolated to predict new velocity values for areas under thick salt bodies, and to allow for "effective stress compensation." This technique allows the modeling to compensate for effective stress changes due to numerous considerations, including but not limited to: changes in the overburden (e.g., salt replacing denser sediments); increased heat flows through the salt to the adjacent sediments underneath; and changes in rock properties due to burial history, e.g. layering. As such, the revised estimates of effective stress values are used to predict velocity fields under the salt. Accordingly, one or more appropriate sets of data are re-migrated with these new velocities. The process can be iterated to generate a final velocity model that is consistent with the geology and the assumptions made during the modeling phase.

Attention is now directed to specific details of method 1300.

The method 1300 is performed at a computing device (e.g., computing system 100, FIG. 1). For a physical body disposed in a subsurface three-dimensional formation, the method includes generating one or more velocity models by processing a set of modeling data that corresponds to the subsurface three-dimensional formation, wherein the one or more velocity models includes a first set of velocity values for a region that is substantially proximate to the physical body (1302).

In some embodiments, the modeling data includes one or more metrics corresponding to characteristics of the subsurface three-dimensional formation, and wherein the modeling data is selected from the group consisting of lithology, porosity, effective stress, and, temperature (1304).

In some embodiments, the one or more velocity models are disposed in a velocity cube (1306).

The method 1300 also includes generating one or more effective stress estimates for the region that is substantially proximate to the physical body (1308).

In some embodiments, generating the one or more effective stress estimates includes compensating for effective stress changes due one or more considerations selected from the group consisting of overburden changes, increased heat flows through physical body, and rock properties (1310).

The method 1300 also includes predicting a second set of velocity values for the region that is substantially proximate to the physical body by extrapolating one or more revised velocities based at least in part on the one or more velocity models, the one or more effective stress estimates, and a rock physics template (1312). Note that the rock physics template can be created according to any suitable method, including those discussed in this disclosure.

In some embodiments, the method 1300 can include refining the one or more velocity models for subsequent processing using models corresponding to the subsurface three-dimensional formation (1314).

In some embodiments, the method 1300 can include refining the one or more velocity models for subsequent processing using one or more tomographic velocities (1316).

In some embodiments, the method 1300 can include performing one or more iterations of migration on the set of modeling data based on the second set of velocity values (1318). Note that any suitable migration technique may be used, including, but not limited to the migration techniques discussed herein.

While certain implementations have been disclosed in the context of seismic data collection and processing, those with skill in the art will recognize that the disclosed methods can be applied in many fields and contexts where data involving structures arrayed in a three-dimensional space may be collected and processed, e.g., medical imaging techniques such as tomography, ultrasound, MRI and the like, SONAR and LIDAR imaging techniques and the like.

The steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Various references that provide further information have been referred to above, and each is incorporated by reference.

Dutta, N. C., (1986); "Shale compaction, burial diagenesis and Geopressure: A dynamic model, solution and some results", In *Thermal Modeling in Sedimentary Basins, J. Burrus, Ed., Editions Technip*, Paris, 149-172.

Dutta, N. C., (1987); "Fluid flow in low permeable media", In *Migration of Hydrocarbons in Sedimentary Basins; Brigitte Doligez, Ed., Editions Technip*, Paris, 567-595.

Raiga-Clemenceau, J., Martin, J. P., and Nicoletis, (1988), "The concept of acoustic formation factor for accurate porosity determination from sonic transit time data"; The Log Analyst; v. 29, p. 54-60.

Eaton, Ben A., (1995), "How to use drilling petrophysical data in prospect evaluation, Part 1"; World Oil, September 1995, p. 69-72.

Bowers, G. L., (1995), "Pore pressure Estimation from Velocity Data: Accounting for Overpressure Mechanisms Besides Undercompaction"; SPE Drilling and Completions, June 1995.

Pennebaker, E., S., (1968); "Seismic Data Indicate Depth, Magnitude of Abnormal Pressures"; World Oil; v. 166, No. 7, p. 73-78

Eberhart-Phillips, D., Lisowski, M., and Zoback, M. D., (1990), "Crustal strain near the Big Bend of the San Andreas Fault: Analysis of the Los Padres-Tehachapi trilateration network"; Journal of Geophysical Research, v. 95, p. 1139-1153.

What is claimed is:

1. A method, comprising:
    for one or more rock types disposed in a subsurface three-dimensional geologic formation:
        generating a geologic interpretation based on a first seismic data volume that corresponds to the subsurface three-dimensional geologic formation;
        generating a set of one or more compaction curves;
        generating a set of one or more acoustic formation factor curves for at least one of the one or more rock types;
    for one or more of the one or more rock types:
        combining, by a processor, the set of one or more compaction curves with the set of one or more acoustic formation factor curves to form a first set of velocity-relationship curves that relate rock velocity with at least one criteria selected from the group consisting of effective stress and temperature;
        deriving a first overburden pressure;
        deriving a first pore pressure state using the first overburden pressure and the first set of velocity-relationship curves; and
        generating a first rock physics template having at least a set of one or more depth dependent velocity curves and one or more bulk density curves.

2. The method of claim 1, further comprising refining the geologic interpretation based on the first rock physics template.

3. The method of claim 2, wherein refining the geologic interpretation includes generating a first velocity model based on the first rock physics template.

4. The method of claim 2, further comprising updating the first velocity model based on tomographic data corresponding to the first seismic data volume.

5. The method of claim 2, wherein refining the geologic interpretation includes:
    calculating one or more anisotropic parameters based on one or more criteria selected from the group consisting of rock physics, geology and seismic gathers; and
    constraining the first velocity model based on the first rock physics template.

6. The method of claim 1, further comprising refining the first rock physics template based on the geologic interpretation.

7. The method of claim 1, further comprising performing migration on the first seismic data volume based on the first rock physics template.

8. The method of claim 1, further comprising calibrating one or more of the set of one or more depth dependent velocity and one or more bulk density curves.

9. A method, comprising:
    for one or more physical bodies disposed in a subsurface three-dimensional formation:
        generating a subsurface interpretation based on a first collected data volume that corresponds to the subsurface three-dimensional formation;
        generating a set of one or more compaction curves;
        generating a set of one or more acoustic formation factor curves for at least one of the one or more physical body types;
    for one or more of the one or more physical body types:
        combining, by a processor, the set of one or more compaction curves with the set of one or more acoustic formation factor curves to form a first set of velocity-relationship curves that relate physical body velocity with at least one criteria selected from the group consisting of effective stress and temperature;
        deriving a first overburden pressure;
        deriving a first pressure state using the first overburden pressure and the first set of velocity-relationship curves, wherein the first pressure state corresponds to an intrabody pressure within the physical body type being analyzed; and
        generating a first physical bodies physics template having at least a set of one or more depth dependent velocity curves and one or more bulk density curves.

10. A method, comprising:
    for at least one rock type disposed in a subsurface three-dimensional geologic formation:
        generating an initial velocity model based on a first seismic data volume that corresponds to the subsurface three-dimensional geologic formation;
        generating a rock physics template having at least a set of two or more depth dependent velocity curves, the set including an upper limit depth dependent velocity curve corresponding to hydrostatic pressure conditions for the respective rock type and a lower limit depth dependent velocity curve corresponding to hydraulic fracture conditions for the respective rock type, and the rock physics template including a range of acceptable velocities for one or more rock types; and
    generating, by a processor, a revised velocity model by revising the initial velocity model based at least in part on the rock physics template.

11. The method of claim 10, wherein the first seismic data volume contains one or more seismic gathers.

12. The method of claim 11, wherein revising the initial velocity model includes performing one or more iterations of tomography to increase relative flatness of at least one of the one or more seismic gathers.

13. The method of claim 11, further comprising performing one or more iterations of migration on at least one of the one or more seismic gathers.

14. The method of claim 12, further comprising determining whether at least one of the one or more seismic gathers is flatter than a predetermined flatness threshold.

15. The method of claim 14, further comprising updating the rock physics template when the determination of whether at least one of the one or more seismic gathers met the predetermined flatness threshold is negative.

16. The method of claim 10, wherein the rock physics template is based at least in part on a geologic interpretation.

17. A method, comprising:
for at least one rock type disposed in a subsurface three-dimensional geologic formation:
generating an initial velocity model based on a first seismic data volume that corresponds to the subsurface three-dimensional geologic formation, the first seismic data volume containing one or more seismic gathers;
generating a rock physics template having at least a set of one or more depth dependent velocity curves; and
generating, by a processor, a revised velocity model by revising the initial velocity model based at least in part on the rock physics template;
performing one or more iterations of migration on at least one of the one or more seismic gathers; and
performing one or more post-stack enhancements to the first seismic data volume when the determination of whether at least one of the one or more seismic gathers met the predetermined flatness threshold is positive.

18. The method of claim 17, further comprising preparing a migrated image.

19. The method of claim 10, further comprising:
estimating one or more metrics selected from the group consisting of pore pressure, fracture pressure, overburden pressure, rock type, fluid type, porosity, and density, wherein the one or more metrics are estimated based at least in part on the revised velocity model.

20. The method of claim 19, wherein the one or more metrics are estimated as a function of depth.

21. The method of claim 19, wherein the one or more metrics are estimated as a function of two-way travel time.

22. The method of claim 13, wherein the migration is isotropic migration.

23. The method of claim 13, wherein the migration is anisotropic migration.

24. A method, comprising:
for at least one physical body type disposed in a subsurface three-dimensional formation:
generating an initial velocity model based on a first collected data volume that corresponds to the subsurface three-dimensional formation;
generating a physical body physics template having at least a set of two or more depth dependent velocity curves, the set including an upper limit depth dependent velocity curve corresponding to hydrostatic pressure conditions for the respective rock type and a lower limit depth dependent velocity curve corresponding to hydraulic fracture conditions for the respective rock type, and the physical body physics template including a range of acceptable velocities for one or more physical body types; and
generating, by a processor, a revised velocity model by revising the initial velocity model based at least in part on the physical body physics template.

25. A computing system, comprising:
at least one processor;
at least one memory; and
one or more programs stored in the at least one memory, wherein the one or more programs are configured to be executed by the one or more processors, the one or more programs including instructions for:
for at least one rock type disposed in a subsurface three-dimensional geologic formation:
generating an initial velocity model based on a first seismic data volume that corresponds to the subsurface three-dimensional geologic formation;
generating a rock physics template having at least a set of two or more depth dependent velocity curves, the set including an upper limit depth dependent velocity curve corresponding to hydrostatic pressure conditions for the respective rock type and a lower limit depth dependent velocity curve corresponding to hydraulic fracture conditions for the respective rock type, and the rock physics template including a range of acceptable velocities for one or more rock types; and
generating a revised velocity model by revising the initial velocity model based at least in part on the rock physics template.

26. A method, comprising:
for a physical body disposed in a subsurface three-dimensional formation:
generating one or more velocity models by processing a set of modeling data that corresponds to the subsurface three-dimensional formation, wherein the one or more velocity models includes a first set of velocity values for a region that is substantially proximate to the physical body;
generating one or more effective stress estimates for the region that is substantially proximate to the physical body; and
predicting, by a processor, a second set of velocity values for the region that is substantially proximate to the physical body by extrapolating one or more revised velocities based at least in part on the one or more velocity models, the one or more effective stress estimates, and a rock physics template.

* * * * *